(12) United States Patent
Kim et al.

(10) Patent No.: US 10,870,090 B2
(45) Date of Patent: Dec. 22, 2020

(54) BLOCK COPOLYMER, CARBON DIOXIDE GAS SEPARATION MEMBRANE AND METHOD FOR MANUFACTURING THE SAME

(71) Applicant: INCHEON UNIVERSITY INDUSTRY ACADEMIC COOPERATION FOUNDATION, Incheon (KR)

(72) Inventors: Tae-Hyun Kim, Incheon (KR); Iqubal Hossain, Kushtia (BD)

(73) Assignee: INCHEON UNIVERSITY INDUSTRY ACADEMIC COOPERATION FOUNDATION, Incheon (KR)

(*) Notice: Subject to any disclaimer, the term of this patent is extended or adjusted under 35 U.S.C. 154(b) by 149 days.

(21) Appl. No.: 16/104,381

(22) Filed: Aug. 17, 2018

(65) Prior Publication Data

US 2019/0329190 A1 Oct. 31, 2019

(30) Foreign Application Priority Data

Apr. 27, 2018 (KR) .................. 10-2018-0049338
Aug. 6, 2018 (KR) .................. 10-2018-0091403

(51) Int. Cl.
*B01D 71/80* (2006.01)
*B01D 53/22* (2006.01)
(Continued)

(52) U.S. Cl.
CPC .......... *B01D 71/80* (2013.01); *B01D 53/228* (2013.01); *B01D 63/10* (2013.01); *B01D 71/64* (2013.01); *C08G 73/0672* (2013.01)

(58) Field of Classification Search
CPC ...... B01D 53/228; B01D 63/10; B01D 71/64; B01D 71/80; B01D 2257/504;
(Continued)

(56) References Cited

U.S. PATENT DOCUMENTS

| | | | | |
|---|---|---|---|---|
| 4,954,144 | A * | 9/1990 | Burgoyne, Jr. | ........ B01D 71/64 128/205.11 |
| 2016/0263533 | A1* | 9/2016 | Odeh | ........ B01D 71/64 |
| 2016/0367948 | A1* | 12/2016 | Song | ........ B01D 53/228 |

FOREIGN PATENT DOCUMENTS

| | | |
|---|---|---|
| JP | 07-112122 | 5/1995 |
| JP | 08-193156 | 7/1996 |

(Continued)

OTHER PUBLICATIONS

2017 KSIEC Spring Meeting, Poster Abstract, May 2017, 5 pages (Year: 2017).*

(Continued)

*Primary Examiner* — Jason M Greene
(74) *Attorney, Agent, or Firm* — Duane Morris LLP; Gregory M. Lefkowitz; Jason M. Nolan

(57) ABSTRACT

The present disclosure relates to a block copolymer, a carbon dioxide separation membrane using the same and a method for preparing the same. The carbon dioxide separation membrane includes a copolymer represented by the follow-
(Continued)

ing [Chemical Formula 1], and thus has excellent thermal, chemical and mechanical stabilities and shows high selectivity and permeability to carbon dioxide.

[Chemical Formula 1]

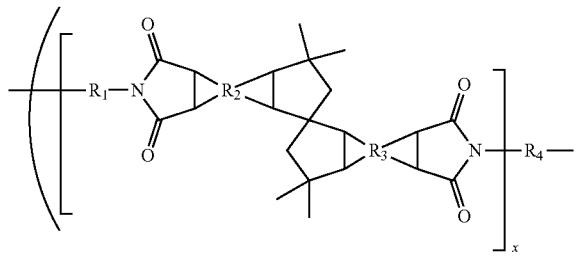

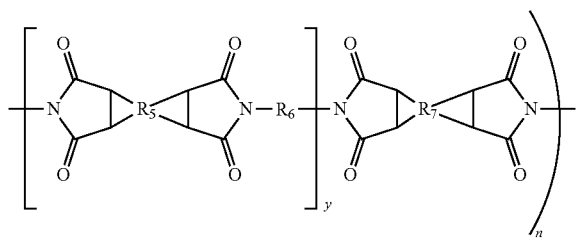

8 Claims, 21 Drawing Sheets

(51) Int. Cl.
*C08G 73/06* (2006.01)
*B01D 63/10* (2006.01)
*B01D 71/64* (2006.01)

(58) Field of Classification Search
CPC ............ C08G 73/0672; C08G 73/1039; C08G 73/1042; C08G 73/1067; C08G 73/1085
See application file for complete search history.

(56) References Cited

FOREIGN PATENT DOCUMENTS

| | | |
|---|---|---|
| KR | 1009327650000 | 12/2009 |
| KR | 1016808320000 | 11/2016 |
| KR | 1018414910000 | 3/2018 |

OTHER PUBLICATIONS

Swaidan et al., "Pure- and mixed-gas propylene/propane permeation properties of spiro- and triptycene-based microporous polyimides", Journal of Membrane Science, 2015, vol. 492, pp. 116-122.
Tanis et al., "A comparison of homopolymer and block copolymer structure in 6FDA-based polyimides", Phys. Chem. Chem. Phys., 2014, vol. 16, pp. 23044-23055.
2018 KSIEC Spring Meeting, Poster Abstract, (May 3, 2018) 16 pages.
2018 The Membrane Society of Korea Spring Meeting, Poster Abstract, (May 17, 2018) 7 pages.
2017 KSIEC Spring Meeting, Poster Abstract, (May 11, 2017) 5 pages.
2017 KSIEC Fall Meeting, Poster Abstract, (Nov. 8, 2017) 5 pages.

* cited by examiner

| Oligomer | Feed ratio (Mole ratio) | Expected length (number of repeating unit) | Experimental length[a] (number of repeating unit) |
|---|---|---|---|
| Compound of [Chemical Formula 2] (Monomer 6:7) | 0.972:1 | y=35 | n=36 |
| Compound of [Chemical Formula 6] (Monomer 4:5) | 0.895:1 | x=9 | m=9 |
| | 0.846:1 | x=6 | m=6 |
| | 0.778:1 | x=4 | m=4.5 |

[a] Determined by $^1$H NMR.

| Membrane [Chemical Formula 2] | Mn *10³ | Mw *10³ | PDI | Exp. Density (g/cm³) | Exp. d-spacing |
|---|---|---|---|---|---|
| Block-1:4 | 62.5 | 81.4 | 1.30 | 1.12 | 13.54, 7.66, 6.38, 5.57 |
| Block-1:6 | 60.0 | 80.8 | 1.35 | 1.18 | 13.06, 7.23, 6.31, 5.49 |
| Block-1:8 | 51.0 | 65.5 | 1.31 | 1.23 | 13.02, 7.15, 6.28, 5.48 |

FIG. 12

| [Chemical Formula 2] | Solvent | | | | | |
|---|---|---|---|---|---|---|
| | CHCl₃ | CH₂Cl₂ | THF | DMF | DMAc | DMSO |
| Block-1:4 | ++ | ++ | ++ | +- | -- | -- |
| Block-1:6 | ++ | ++ | ++ | +- | -- | -- |
| Block-1:8 | ++ | ++ | +- | +- | -- | -- |

ᵃ++: Completely soluble, +-: partially soluble and --: insoluble

FIG. 13

| Membrane | | Stress, MPa | Strain, % | Young's Modulus, GPa |
|---|---|---|---|---|
| PIM-PI-1 | | 78.81 | 6.65 | 2.48 |
| Block-1:4 | | 70.11 | 5.17 | 2.25 |
| Block-1:6 | [Chemical Formula 2] | 64.96 | 4.11 | 2.13 |
| Block-1:8 | | 66.03 | 5.02 | 2.23 |

| Property<br>[Chemical Formula 2] | BET Surface area m²/g | BJH volume cm³/g | BJH pore diameter, Å |
|---|---|---|---|
| Block-1:4 | 397.34 | 0.365 | 63.96 |
| Block-1:6 | 341.43 | 0.272 | 44.81 |
| Block-1:8 | 272.83 | 0.267 | 39.41 |

FIG. 20

| Membrane | $P_{CO2}$ | $P_{O2}$ | $P_{N2}$ | $P_{CH4}$ | $\alpha_{CO2/N2}$ | $\alpha_{O2/N2}$ | $\alpha_{CO2/CH4}$ |
|---|---|---|---|---|---|---|---|
| PIM-PI-1[a] | 1100 | 150 | 47 | 77 | 23.4 | 3.2 | 14.3 |
| Block-1:4 | 2694 | 484 | 146 | 152 | 18.5 | 3.3 | 17.7 |
| Block-1:6 | 1660 | 354 | 94 | 104 | 17.7 | 3.8 | 16.0 |
| Block-1:8 | 1435 | 313 | 80 | 63 | 17.9 | 3.9 | 22.8 |
| Random-1:4 | 1265 | 267 | 76 | 76.5 | 16.7 | 3.5 | 16.5 |

[a]Permeabilities in barrers, where 1 barrer = $10^{-10}$ $cm^3$(STP)cm/$cm^2$scmHg

FIG. 21

| Membrane of [Chemical Formula 2] | $D_{CO2}$ | $D_{O2}$ | $D_{N2}$ | $D_{CH4}$ | $S_{CO2}$ | $S_{O2}$ | $S_{N2}$ | $S_{CH4}$ |
|---|---|---|---|---|---|---|---|---|
| Block-1:4 | 71.41 | 186 | 45.5 | 15.1 | 0.377 | 0.026 | 0.032 | 0.101 |
| Block-1:6 | 29.57 | 70.6 | 18.1 | 6.9 | 0.561 | 0.050 | 0.052 | 0.158 |
| Block-1:8 | 25.54 | 61.6 | 11.8 | 4.1 | 0.562 | 0.051 | 0.068 | 0.153 |

[a]Diffusivity coefficient [$10^{-10}$ $cm^2$/s], [a]Solubility coefficient [$cm^3$(STP)/$cm^3$cmHg]

FIG. 22

| [Chemical Formula 2] | $D_{CO2/N2}$ | $D_{CO2/CH4}$ | $D_{N2/CH4}$ | $S_{CO2/N2}$ | $S_{CO2/CH4}$ | $S_{N2/CH4}$ |
|---|---|---|---|---|---|---|
| Block-1:4 | 1.57 | 4.73 | 3.01 | 13.15 | 3.77 | 3.16 |
| Block-1:6 | 1.63 | 4.29 | 2.62 | 10.96 | 3.75 | 3.04 |
| Block-1:8 | 2.16 | 6.25 | 2.87 | 8.25 | 3.67 | 2.25 |

FIG. 23

Compound of [Chemical Formula 2]-Block-1:4

| Pressure (torr) | Permeability[a] P (barrer) | | | | Selectivity, α | |
|---|---|---|---|---|---|---|
| | $CO_2$ | $O_2$ | $N_2$ | $CH_4$ | $CO_2/N_2$ | $CO_2/CH_4$ |
| 75 | 3547 | 501 | 142 | 147 | 25 | 24.13 |
| 100 | 3530 | 493 | 142 | 147 | 24.86 | 24.01 |
| 150 | 3500 | 491 | 142 | 148 | 24.65 | 23.65 |
| 200 | 3409 | 488 | 142 | 149 | 24 | 22.88 |
| 400 | 3224 | 486 | 143 | 148 | 22.54 | 21.78 |
| 750 | 2913 | 485 | 144 | 151 | 20.23 | 19.29 |
| 1500 | 2694 | 484 | 146 | 152 | 18.45 | 17.72 |

[a]Permeabilities in barrers, where 1barrer=10$^{-10}$ cm$^3$(STP)cm/cm$^2$scmHg

FIG. 24

Compound of [Chemical Formula 2]-Block-1:4

| Pressure (torr) | Diffusivity[b] D | | | | Solubility[c] S | | | |
|---|---|---|---|---|---|---|---|---|
| | $CO_2$ | $O_2$ | $N_2$ | $CH_4$ | $CO_2$ | $O_2$ | $N_2$ | $CH_4$ |
| 75 | 39.05 | - | - | 15.1 | 0.91 | - | - | 0.097 |
| 100 | 37.9 | 88 | - | 13.0 | 0.93 | 0.056 | - | 0.113 |
| 150 | 40.3 | 103 | 40.7 | 12.0 | 0.87 | 0.048 | 0.035 | 0.123 |
| 200 | 41.7 | 106 | 41.4 | 11.5 | 0.82 | 0.046 | 0.034 | 0.120 |
| 400 | 49.5 | 148 | 47.6 | 11.7 | 0.64 | 0.033 | 0.030 | 0.127 |
| 750 | 58.2 | 161 | 50.7 | 13.3 | 0.50 | 0.030 | 0.028 | 0.114 |
| 1500 | 71.4 | 186 | 58.9 | 15.1 | 0.38 | 0.026 | 0.028 | 0.101 |

[b]Diffusivity coefficient [10$^{-10}$ cm$^2$/s], [c]Solubility coefficient [cm$^3$(STP)/cm$^3$cmHg]

BLOCK COPOLYMER, CARBON DIOXIDE GAS SEPARATION MEMBRANE AND METHOD FOR MANUFACTURING THE SAME

CROSS-REFERENCE TO RELATED APPLICATIONS

This application claims priority under 35 U.S.C. § 119 to Korean Patent Application Nos. 10-2018-0049338 and 10-2018-0091403 filed on Apr. 27, 2018 and Aug. 6, 2018, respectively in the Korean Intellectual Property Office, the disclosure of which is incorporated herein by reference in its entirety.

TECHNICAL FIELD

The following disclosure relates to a novel block copolymer, a separation membrane which shows high selectivity and permeability to carbon dioxide by using the same, and a method for manufacturing the same.

BACKGROUND

Many attempts have been made to collect and store greenhouse gas which is a cause of global warming. Particularly, many technologies, including a chemical absorption process, adsorption process, membrane separation process, cryogenic process, or the like, have been developed to reduce carbon dioxide, an acidic gas among greenhouse gases.

In addition, recently, a large amount of carbon dioxide contained in the exhaust gas discharged from an engine during the sailing of large ships, such as container ships or oil tankers, is emitted directly to the air, which results in acceleration of global warming. Therefore, it is required for such ships themselves to be provided with a device capable of treating carbon dioxide generated during sailing.

Further, a large amount of carbon dioxide is generated from the synthetic gas synthesized in a large scale plant for hydrogen production or urea production, or the like, natural gas, exhaust gas, etc. The process for separating such carbon dioxide may realize energy saving, and thus a gas separation membrane process has been given many attentions recently.

As gas separation membranes for use in the gas separation membrane process, various types of membranes have been suggested to date. For example, Japanese Patent Laid-Open No. Hei07-112122 discloses a carbon dioxide separation gel membrane including a hydrogel membrane formed by allowing an aqueous solution containing a carbon dioxide carrier to be absorbed to a vinyl alcohol-acrylate copolymer having a crosslinked structure. The disclosure according to the related art relates to a polymer material obtained by absorption of an aqueous solution containing a carbon dioxide carrier to form hydrogel, and provides a accelerated carbon dioxide transport membrane applied to practical use and a method for manufacturing the same by solving the problem of a conventionally known polyelectrolyte which has high absorption ability but low strength and shows a difficulty in forming a film-like shape through the use of a vinyl alcohol-acrylate copolymer.

Japanese Laid-Open Patent No. Hei08-193156 discloses a gas separation membrane using polyacrylic acid for a polymer material to be formed into hydrogel. Herein, provided is a carbon dioxide separation film formed of a resin composition including a reaction mixture of polyacrylic acid with a predetermined equivalent of aliphatic amine. In the disclosure of the related art, suggested is an accelerated carbon dioxide transport membrane including a heat resistant porous membrane in which a gel layer obtained by incorporating glycine and a deprotonating agent to a hydrogel membrane is supported. However, the accelerated carbon dioxide transport membrane has weak physical properties.

Therefore, there is a need for a carbon dioxide separation membrane which has excellent physical properties, including thermal, chemical and mechanical stabilities, and shows high selectivity and permeability to carbon dioxide.

REFERENCES

Japanese Laid-Open Patent No. Hei07-112122
Japanese Laid-Open Patent No. Hei08-193156
Korean Patent Publication No. 1680832
Korean Patent Publication No. 1841491

SUMMARY

The present disclosure is designed to solve the problems of the related art, and an embodiment of the present disclosure is directed to providing a novel block copolymer.

Another embodiment of the present disclosure is directed to providing a separation membrane which includes the novel block copolymer and thus shows high selectivity and permeability to carbon dioxide.

Still another embodiment of the present disclosure is directed to providing a carbon dioxide separation membrane module including the carbon dioxide separation membrane.

Still another embodiment of the present disclosure is directed to providing an apparatus for separating carbon dioxide which includes the carbon dioxide separation membrane module.

Still another embodiment of the present disclosure is directed to providing a method for manufacturing the carbon dioxide separation membrane.

Yet another embodiment of the present disclosure is directed to providing a method for separating carbon dioxide by using the apparatus for separating carbon dioxide.

In one aspect, there is provided a block copolymer represented by the following [Chemical Formula 1]:

[Chemical Formula 1]

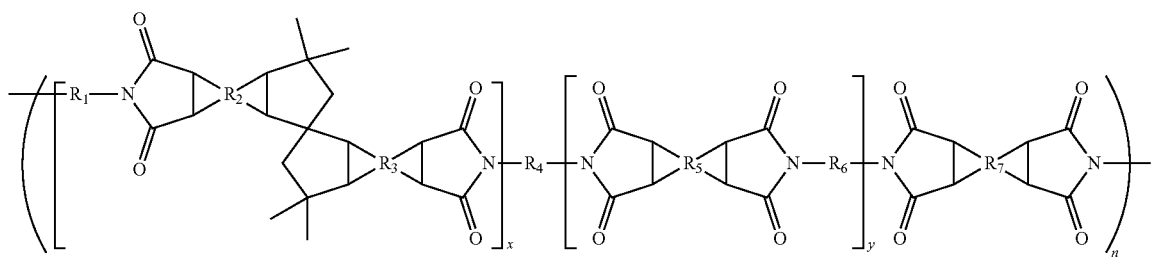

wherein each of $R_1$ to $R_7$ is a C1-C10 alkyl group, C1-C10 alkoxy group, C1-C10 heteroalkyl group, substituted or non-substituted C5-C14 aryl group or a substituted or non-substituted C4-C19 heteroaryl group containing N, S, O; x is an integer of 5-100; y is an integer of 100-300; and n is an integer of 5-150.

In the above $R_1$ to $R_7$, each substituent of the substituted aryl or substituted heteroaryl is a C1-C10 alkyl group, C1-C10 alkoxy group, C1-C10 alkylamino group, C1-C10 alkylsilyl group, C5-C14 aryl group, C4-C19 heteroaryl group containing N, S, O, cyano group or a halogen.

The carbon dioxide separation membrane may include a block copolymer represented by the following [Chemical Formula 2]:

[Chemical Formula 2]

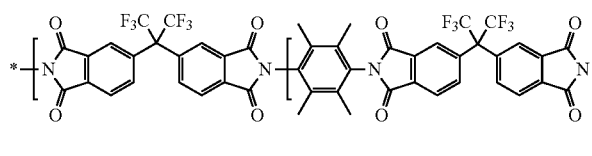

In the block copolymer represented by [Chemical Formula 1], the repeating units may be mixed at a ratio of x:y of 1:3-10, preferably 1:4-6. In addition, the carbon dioxide separation membrane disclosed herein may include the block copolymer represented by [Chemical Formula 1].

In addition, the carbon dioxide separation membrane module disclosed herein may be provided with the carbon dioxide separation membrane.

In addition, the apparatus for separating carbon dioxide disclosed herein may include the carbon dioxide separation membrane module, and a gas supplying unit for supplying a mixed gas containing at least carbon dioxide and water steam to the carbon dioxide separation membrane module.

In addition, the method for manufacturing the carbon dioxide separation membrane disclosed herein may include the steps of: (A) preparing a compound represented by the following [Chemical Formula 3]; (B) preparing a compound represented by the following [Chemical Formula 4]; and (C) polymerizing the compound represented by [Chemical Formula 3] with the compound represented by [Chemical Formula 4] at a repeating unit ratio of 1:3-10 to obtain a block copolymer.

[Chemical Formula 3]

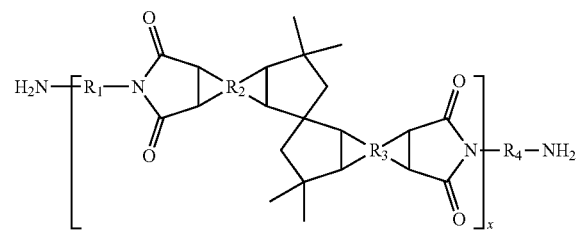

[Chemical Formula 4]

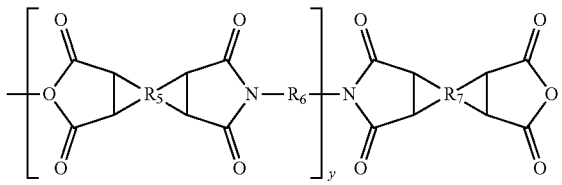

In Chemical Formula 3, each of $R_1$ to $R_4$ is a C1-C10 alkyl group, C1-C10 alkoxy group, C1-C10 heteroalkyl group, substituted or non-substituted C5-C14 aryl group or a substituted or non-substituted C4-C19 heteroaryl group containing N, S, O; and x is an integer of 5-100.

In Chemical Formula 4, each of $R_5$ to $R_7$ is a C1-C10 alkyl group, C1-C10 alkoxy group, C1-C10 heteroalkyl group, substituted or non-substituted C5-C14 aryl group or a substituted or non-substituted C4-C19 heteroaryl group containing N, S, O; and y is an integer of 100-300.

Further, the method for separating carbon dioxide disclosed herein may use the apparatus for separating carbon dioxide.

The carbon dioxide separation membrane including the novel block copolymer according to the present disclosure has excellent thermal, chemical and mechanical stabilities, and shows high selectivity and permeability to carbon dioxide.

BRIEF DESCRIPTION OF THE DRAWINGS

FIG. 12 shows solubility of each of three compounds represented by [Chemical Formula 2] (Block-1:4, Block-1:6 and Block-1:8).

FIG. 13 shows tensile force of each of three compounds represented by [Chemical Formula 2] (Block-1:4, Block-1:6 and Block-1:8).

FIG. 20 shows gas permeability coefficient and selectivity of each of three compounds represented by [Chemical Formula 2] (Block-1:4, Block-1:6 and Block-1:8).

FIG. 21 shows gas diffusion coefficient and solubility coefficient of each of three compounds represented by [Chemical Formula 2] (Block-1:4, Block-1:6 and Block-1:8).

FIG. 22 shows the results of solubility selectivity and diffusivity selectivity determination of each of three compounds represented by [Chemical Formula 2] (Block-1:4, Block-1:6 and Block-1:8).

FIG. 23 shows permeability and selectivity values of a compound represented by Chemical Formula 2 (Block-1:4) depending on pressure and gas type.

FIG. 24 shows diffusivity and solubility values of a compound represented by Chemical Formula 2 (Block-1:4) depending on pressure and gas type.

DETAILED DESCRIPTION OF EMBODIMENTS

Figure 1:
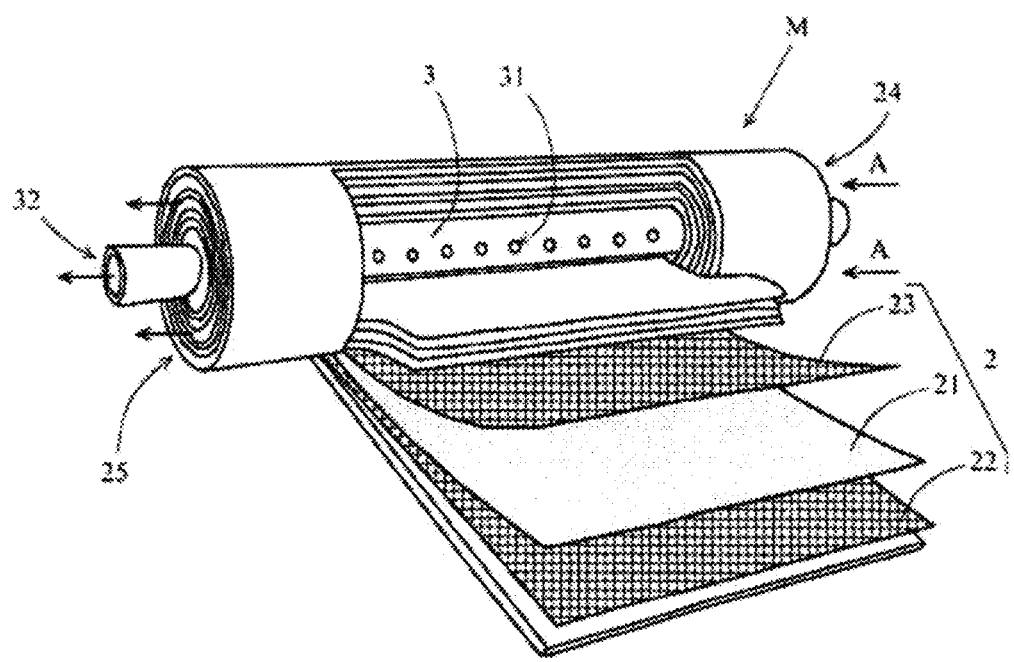
FIG. 1 is a detailed view illustrating the structure of a spiral type carbon dioxide separation membrane module using the gas separation membrane according to the present disclosure.

The present disclosure relates to a novel block copolymer, a separation membrane which shows high selectivity and permeability by using the same, and a method for preparing the same.

There have been many attempts to combine two or more material characteristics with each other through blending or copolymerization in order to provide excellent materials. However, in most cases, it is difficult to obtain desired characteristics due to non-hybridization of polymer even though monomers are blended homogeneously. This results from low entropy of mixing between two different polymer chains.

Moreover, blending is simple mixing by which desired characteristics cannot be improved in combination in most cases.

On the contrary, copolymers are advantageous in that they provide polymer characteristics, such as flexibility, crystallinity, thermal stability, glass transition temperature and gas transport, in combination in a desired manner through the introduction of a selected second or a third monomer.

According to the present disclosure, a block copolymer is provided in order to obtain desired characteristics. The block copolymer according to the present disclosure has a controlled microstructure so that not only its physical characteristics but also its gas permeability and selectivity may be controlled. The characteristics of the block copolymer may be controlled by virtue of its amphiphilic behavior. This is because the block copolymer includes a single polymer chain containing two or more different homopolymers.

The block copolymer spontaneously forms a microphase-separated structure due to incompatible chemical ingredients derived from the repulsion between non-similar segments and a balance in three-dimensional entropy loss of other blocks.

The gas transport property of the block copolymer according to the present disclosure depends on its shape. For example, the block copolymer according to the present disclosure has special controlling ability in the nanoparticles introduced by additional interaction between the blocks.

According to the present disclosure, two types of compositions having a significant difference are combined to analyze the effect of gas transport property having gas separation characteristics which provide the block copolymer with a high free volume and excellent mechanical and thermal properties. The characteristics of the block copolymer may be adjusted with ease by a change (different ratio of blocks) in chain length, and thus it is possible to improve the gas separation characteristics of the block copolymer significantly.

Hereinafter, the present disclosure will be described in detail.

The novel block copolymer according to the present disclosure may be represented by the following [Chemical Formula 1].

[Chemical Formula 1]

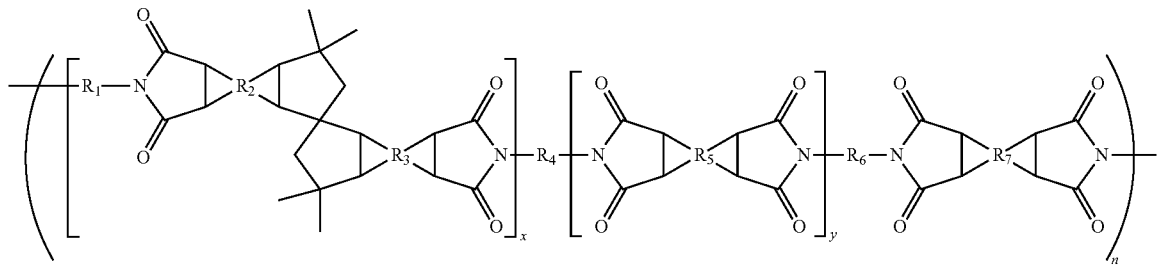

wherein each of $R_1$ to $R_7$ is a C1-C10 alkyl group, C1-C10 alkoxy group, C1-C10 heteroalkyl group, substituted or non-substituted C5-C14 aryl group, or a substituted or non-substituted C4-C19 heteroaryl group containing N, S, O; x is an integer of 5-100; y is an integer of 100-300; and n is an integer of 5-150.

In the above $R_1$ to $R_7$, each substituent of the substituted aryl or substituted heteroaryl may be a C1-C10 alkyl group, C1-C10 alkoxy group, C1-C10 alkylamino group, C1-C10 alkylsilyl group, C5-C14 aryl group, C4-C19 heteroaryl group containing N, S, O, cyano group or a halogen. The substituent with which the above-mentioned substituent is substituted may be a C1-C10 alkyl group, C1-C10 alkoxy group, C1-C10 alkylamino group, C1-C10 alkylsilyl group, C5-C14 aryl group, C4-C19 heteroaryl group containing N, S, O, cyano group or a halogen.

Particularly, in the compound represented by [Chemical Formula 1], each of $R_1$ and $R_4$ may be at least one selected from the group consisting of

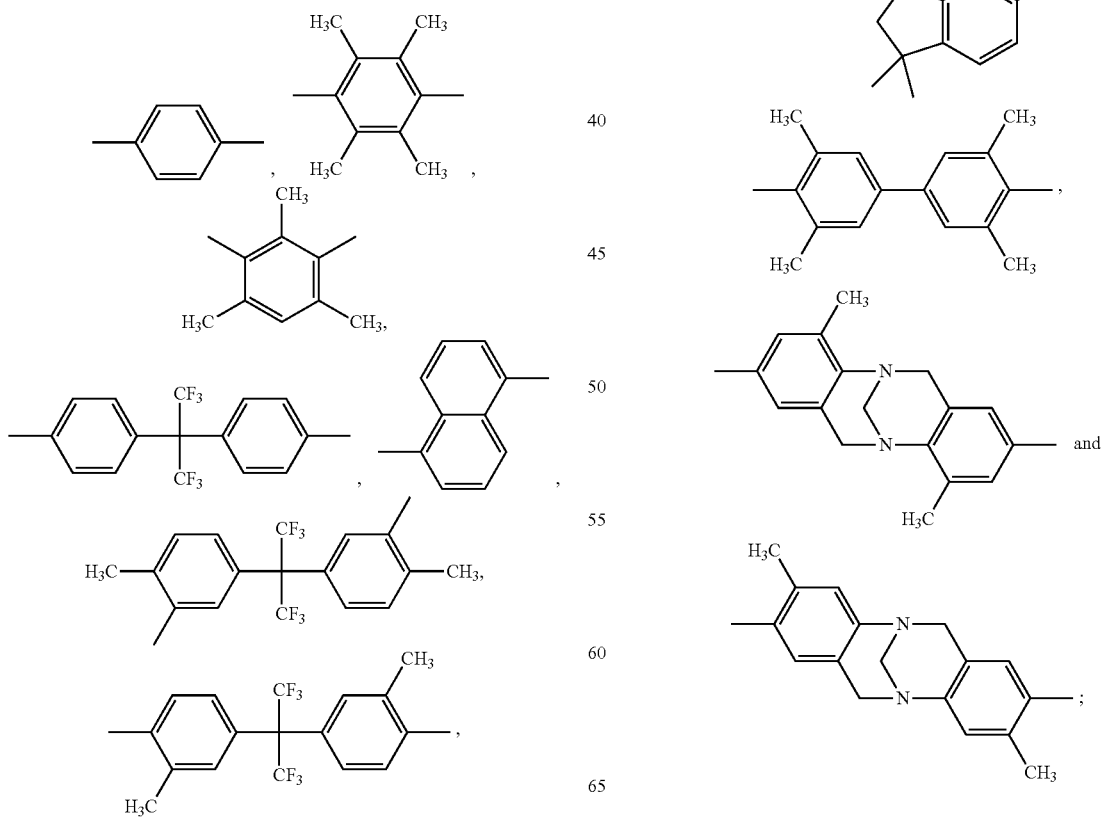

each of $R_2$ and $R_3$ may be at least one selected from

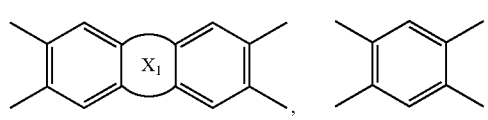

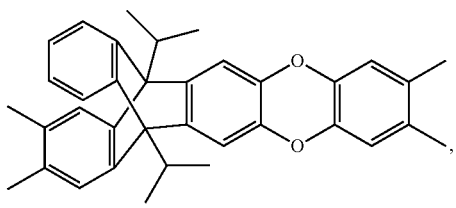

wherein $X_1$ may be a C1-C10 alkyl group, C1-C10 alkoxy group, C1-C10 heteroalkyl group, substituted or non-substituted C5-C14 aryl group, or a substituted or non-substituted C4-C19 heteroaryl group containing N, S, O, and preferably $X_1$ may be at least one selected from

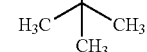

In addition, each of $R_5$ and $R_7$ may be at least one selected from the group consisting of

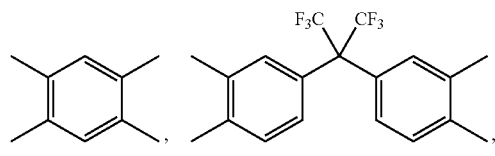

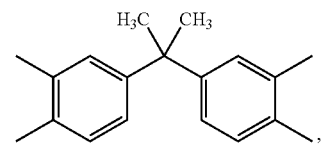

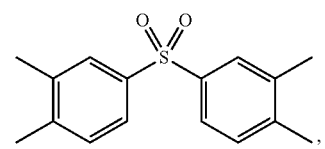

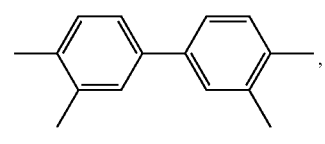

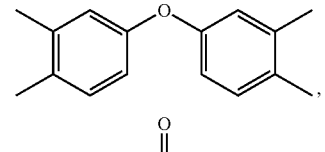

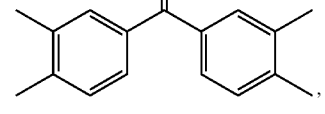

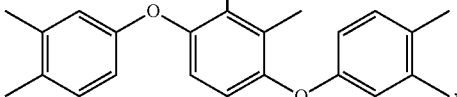

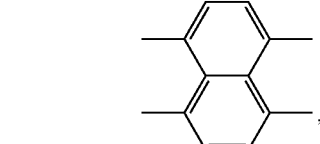

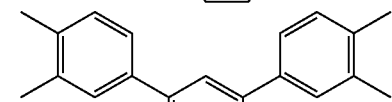

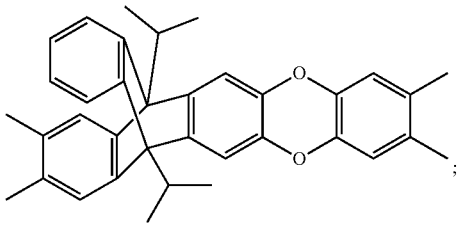

and $R_5$ may be at least one selected from the group consisting of

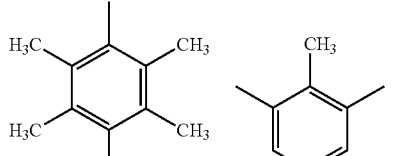

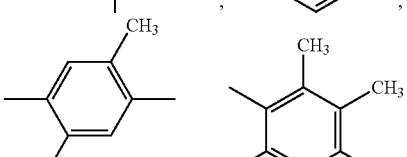

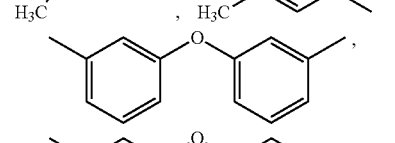

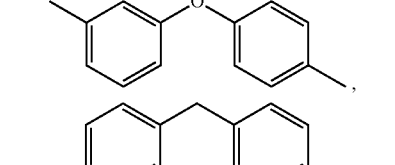

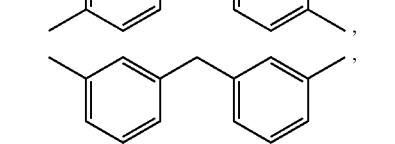

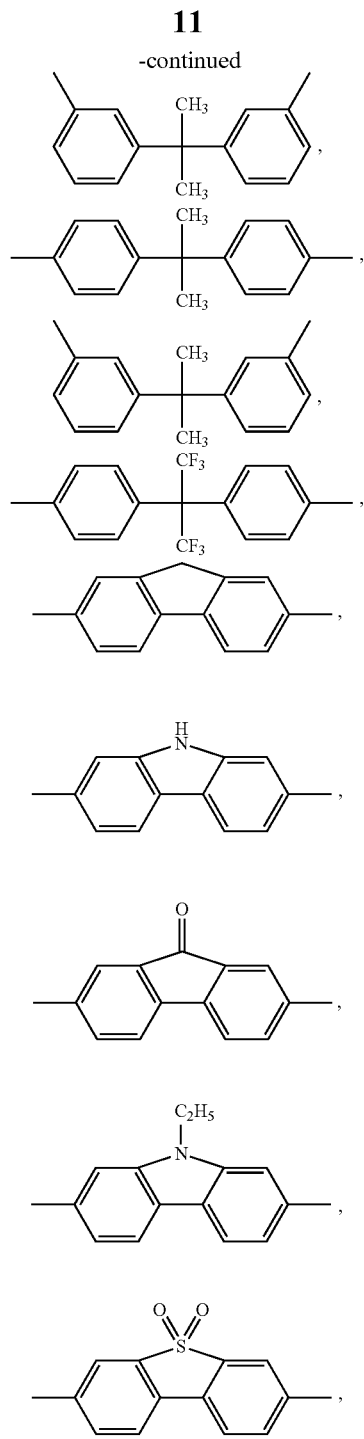
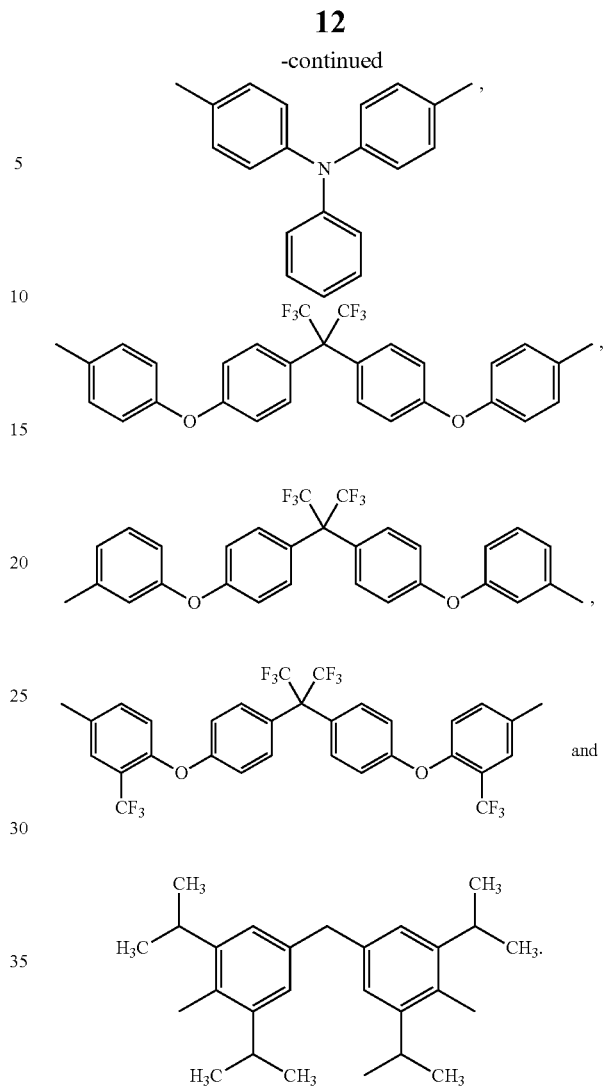

In the compound represented by [Chemical Formula 1] according to the present disclosure, the repeating units are mixed at a ratio of x to y of 1:3-10, preferably 1:4-6. In other words, when x is 1, y is 3-10. When the ratio of y to x is less than the lower limit, thermal, chemical and mechanical stabilities of the membrane may be degraded. When the ratio of y to x is larger than the upper limit, gas permeability and selectivity of the membrane may be degraded.

Particularly, the block copolymer represented by [Chemical Formula 1] having the above-described structure may be a block copolymer represented by the following [Chemical Formula 2], but is not limited thereto.

[Chemical Formula 2]

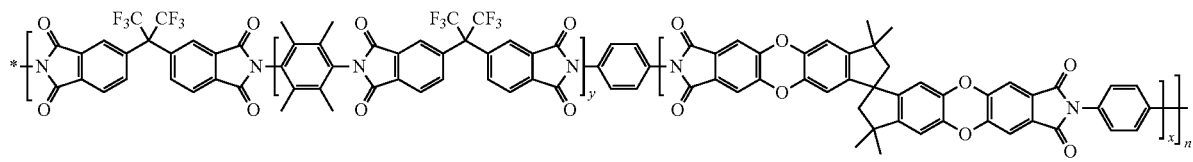

In addition, the present disclosure provides a carbon dioxide separation membrane including the novel block copolymer represented by the above [Chemical Formula 1].

The carbon dioxide separation membrane including the novel block copolymer represented by [Chemical Formula 1] has excellent thermal, chemical and mechanical stabilities, and thus shows high selectivity and permeability to carbon dioxide.

In addition, the present disclosure provides a carbon dioxide separation membrane module provided with the carbon dioxide separation membrane; and also provides an apparatus for separating carbon dioxide, including: the carbon dioxide separation membrane module, and a gas supplying unit for supplying a mixed gas containing at least carbon dioxide and water steam to the carbon dioxide separation membrane module.

The carbon dioxide separation membrane module according to the present disclosure is provided with the carbon dioxide separation membrane according to the present disclosure, and may have any shape selected from a spiral shape, cylindrical shape, hollow fiber shape, pleated type, plate type and a frame type.

FIG. 1 shows a partial segment of the spiral type carbon dioxide separation membrane module using the carbon dioxide separation membrane according to the present disclosure.

In the spiral type carbon dioxide separation membrane module M, a stack 2 in which a carbon dioxide separation membrane 21, a feed side flow path material 22 and a permeation side flow path material 23 are stacked is wound many times on the outer circumferential surface of a gas-collecting pipe 3 having a plurality of holes 31. Preferably, the feed side flow path material 22 and the permeation side flow path material 23 have a function of accelerating turbulent flow (surface regeneration of the membrane surface) of a mixed gas containing carbon dioxide feed and water steam and the gas permeated through the carbon dioxide separation membrane 21 to increase the membrane permeation rate of carbon dioxide in fluid feed and a function of minimizing the pressure loss at the feed side.

Since the feed side flow path material 22 and the permeation side flow path material 23 preferably have a function as spacers and a function of generating turbulent flow in the mixed gas, a mesh-like material is used suitably therefor. The shape of a unit cell of the mesh is selected from a tomb-like shape, parallelogram shape, or the like, depending on purposes, because the flow path of the mixed gas varies with the shape of the mesh. Although there is no particular limitation in the material forming the feed side flow path 22 and the permeation side flow path 23, it is a material having heat resistance preferably, since the gas separation membrane according to the present disclosure is used at a temperature of 100° C. or higher. The material exemplified as a material for the above-described hydrophobic membrane C may be used preferably herein.

The apparatus for separating carbon dioxide according to the present disclosure includes the carbon dioxide separation membrane module according to the present disclosure and a gas supplying unit for supplying a mixed gas containing at least carbon dioxide and water steam to the carbon dioxide separation membrane module. The gas supplying unit includes an inlet for supplying the mixed gas containing carbon dioxide and water steam to one side of the carbon dioxide separation membrane, and may be the inlet of the carbon dioxide separation membrane module itself, or a container-like gas supplying member in which the carbon dioxide separation membrane module is received and a feed side space communicating with the inlet of the carbon dioxide separation membrane module is formed therein. The inlet may be one surface of the carbon dioxide separation membrane or a stack including the same, or may be a sectional surface of the carbon dioxide separation membrane or a stack including the same. For example, in the spiral type carbon dioxide separation membrane module M, the inlet 24 may be one sectional surface or both sectional surfaces of the carbon dioxide separation membrane 21 or the stack 2 including the same.

In addition, the present disclosure provides a method for manufacturing a carbon dioxide separation membrane.

The method for manufacturing a carbon dioxide separation membrane according to the present disclosure includes the following steps of: (A) preparing a compound represented by the following [Chemical Formula 3]; (B) preparing a compound represented by the following [Chemical Formula 4]; and (C) polymerizing the compound represented by [Chemical Formula 3] with the compound represented by [Chemical Formula 4] at a repeating unit ratio of 1:3-10 to obtain a block copolymer.

First, a compound represented by the following [Chemical Formula 3] is prepared and a compound represented by the following [Chemical Formula 4] is prepared to obtain a block copolymer, and then the compound represented by [Chemical Formula 3] is polymerized with the compound represented by [Chemical Formula 4] at a ratio of repeating units of 1:3-10.

[Chemical Formula 3]

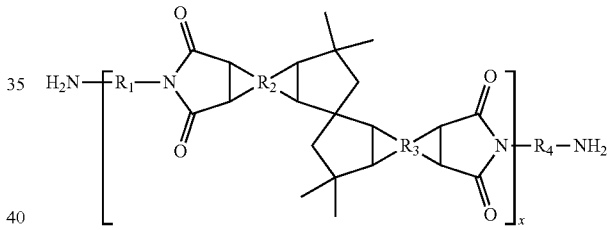

[Chemical Formula 4]

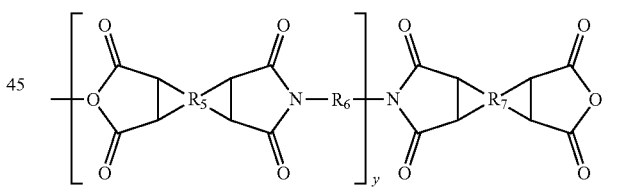

Hereinafter, the present disclosure will be described in detail with reference to preferred examples. However, it should be understood that the following examples are for illustrative purposes only, since various changes and modifications may be made without departing from the spirit and scope of the disclosure as defined in the following claims.

EXAMPLES 4,4'-(Hexafluoroisopropylidene) diphthalic anhydride (6FDA), durene (2,3,5,6-tetramethyl benzene-1,4-diamine), 4,5-dichlorophthalonitrile (98%), 1,4-phenylene diamine (PDA) were purchased from Tokyo Chemical Industry Co. In addition, 5,5',6,6'-tetrahydroxy 3,3,3',3'-tetramethyl-1,10-spirobisindane (97%) was purchased from Alfa Aesar.

Quinoline, m-cresol, acetic anhydride, toluene and triethylamine are purchased from Sigma Aldrich; ethanol, dimethyl formamide, dimethyl acetamide, potassium carbonate and potassium hydroxide were purchased from Dae Jung Chemical Co. (Korea).

6FDA, durene and $K_2CO_3$ were dried under vacuum at 60° C. for 24 hours before use.

Preparation Example 1. Preparation of Block Copolymer Represented by [Chemical Formula 2]

(1) Preparation of Compound Represented by [Chemical Formula 9]

Figure 2:
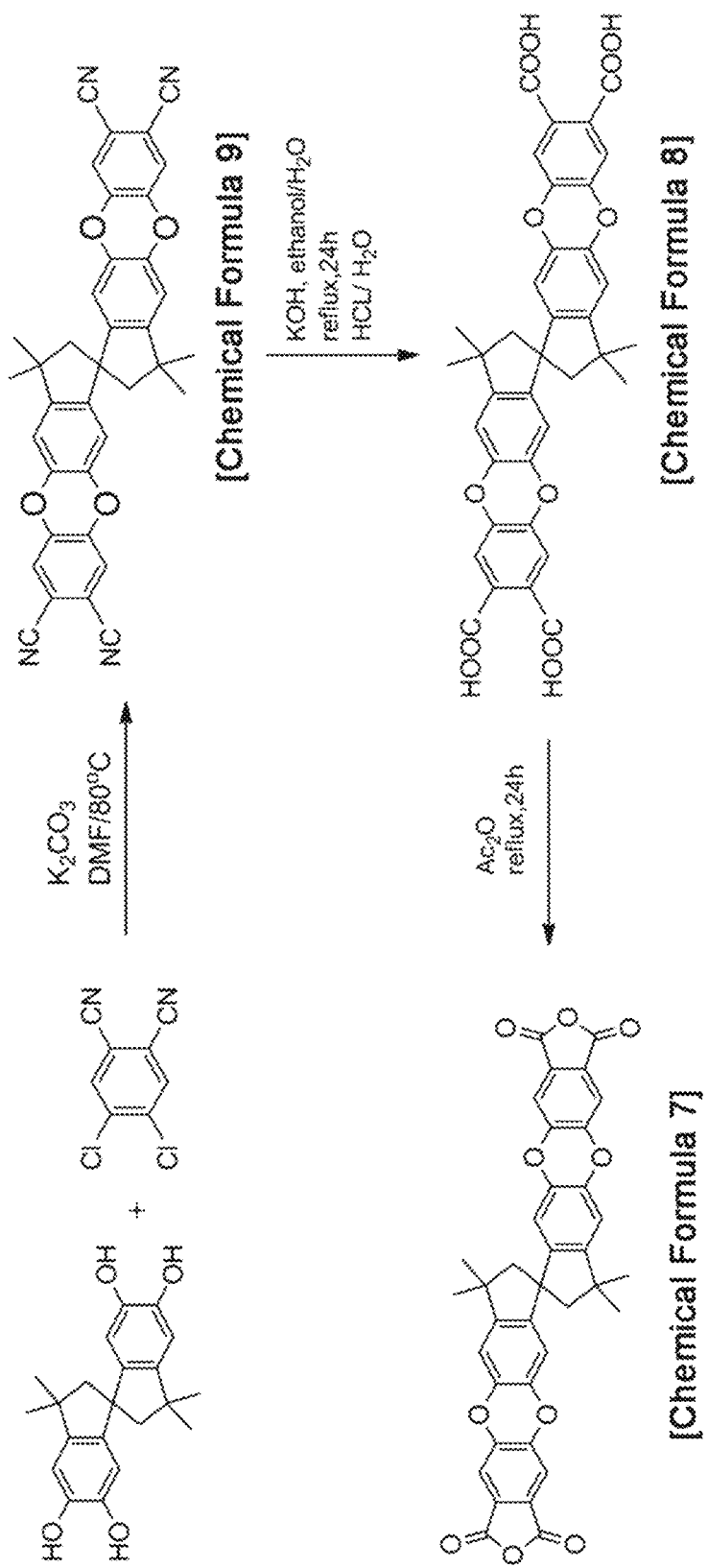
FIG. 2 is a reaction scheme illustrating the process for preparing a compound represented by [Chemical Formula 7] according to an embodiment.

The compound represented by [Chemical Formula 9] was prepared as depicted in FIG. 2. First, 4,5-dichlorophthalonitrile (20 g, 50.76 mmol) and 3,3,3',3'-tetramethyl-1,1'-spirobis-(indan-5,5',6,6'-tetrol), (16 g, 23.50 mmol) were introduced to a round-bottom flask and treated under $N_2$. Next, dry dimethyl formamide (200 cm$^3$) and an excessive amount of $K_2CO_3$ (40 g) were added gradually and the reaction mixture was agitated at 80° C. for 6 hours. Then, the resultant product was separated, washed with distilled water and treated with methanol and dichloromethane to carry out recrystallization. In this manner, a compound represented by [Chemical Formula 9] was obtained (yield: 60%).

$^1$H NMR; $\delta_H$ (400 MHz, DMSO-d$_6$); 7.80 (2H, s, ArH), 7.72 (2H, br s, ArH), 6.96 (2H, s, $2^{Lx}$ArH), 6.35 (2H, s, ArH), 2.26 (2H, d, J=12, CH$_2$), 2.11 (2H, d, J=12, CH$_2$), 1.32 (3H, s, CH3$_g$), 1.32 (3H, s, CH$_3$).

(2) Preparation of Compound Represented by [Chemical Formula 8]

The compound represented by [Chemical Formula 8] was prepared as depicted in FIG. 2. First, the compound represented by [Chemical Formula 9] (20 g, 0.034 mol) was added to a solution containing a mixture of ethanol-water (volume ratio 1:1; 400 mL) mixed with potassium hydroxide (38.13 g, 0.68 mol). The mixture was agitated under reflux for 20 hours and the reaction mixture was filtered at high temperature after the completion of reaction to remove insoluble particles. After cooling, the filtrate was acidified with hydrochloric acid. The resultant white precipitate was filtered, washed with cold distilled water and then dried to obtain a compound represented by [Chemical Formula 8] (21.7 g, yield: 96%), which, in turn, was used for the subsequent reaction without additional purification.

$^1$H NMR; $\delta_H$ (400 MHz, DMSO-d); 7.14 (2H, s, ArH), 7.07 (2H, s, ArH), 6.89 (2H, s, ArH), 6.31 (2H, s, ArH), 2.25-2.22 (2H, d, J=12 Hz, CH$_2$), 2.10-2.07 (2H, d, J=12 Hz, CH$_2$), 1.31 (6H, s, CH$_3$), 1.23 (6H, s, CH$_3$).

(3) Preparation of Compound Represented by [Chemical Formula 7]

The compound represented by [Chemical Formula 7] was prepared as depicted in FIG. 2. First, the compound represented by [Chemical Formula 8] (20 g, 0.03 mol) was mixed with acetic anhydride and the mixture was refluxed under nitrogen atmosphere for 24 hours. After cooling, light yellow-colored powder was collected through filtration, washed with acetic acid and toluene and dried under vacuum at 80° C. to obtain a compound represented by [Chemical Formula 7] as yellow powder (16.03 g, yield: 85%), which, in turn, was recrystallized with toluene and used after drying in a vacuum oven.

$^1$H NMR; $\delta_H$ (400 MHz, DMSO-d$_6$); 7.62 (2H, s, ArH), 7.54 (2H, s, ArH), 6.97 (2H, s, ArH), 6.37 (2H, s, ArH), 2.27 (2H, d, J=13 Hz, CH$_2$), 2.11 (2H, d, J=13 Hz, CH$_2$), 1.32 (6H, s, CH$_3$), 1.25 (6H, s, CH$_3$).

(4) Preparation of Compound Represented by [Chemical Formula 6]

The length of a chain is controlled by adjusting the ratio of monomers based on the following [Mathematical Formula 1].

Figure 3:
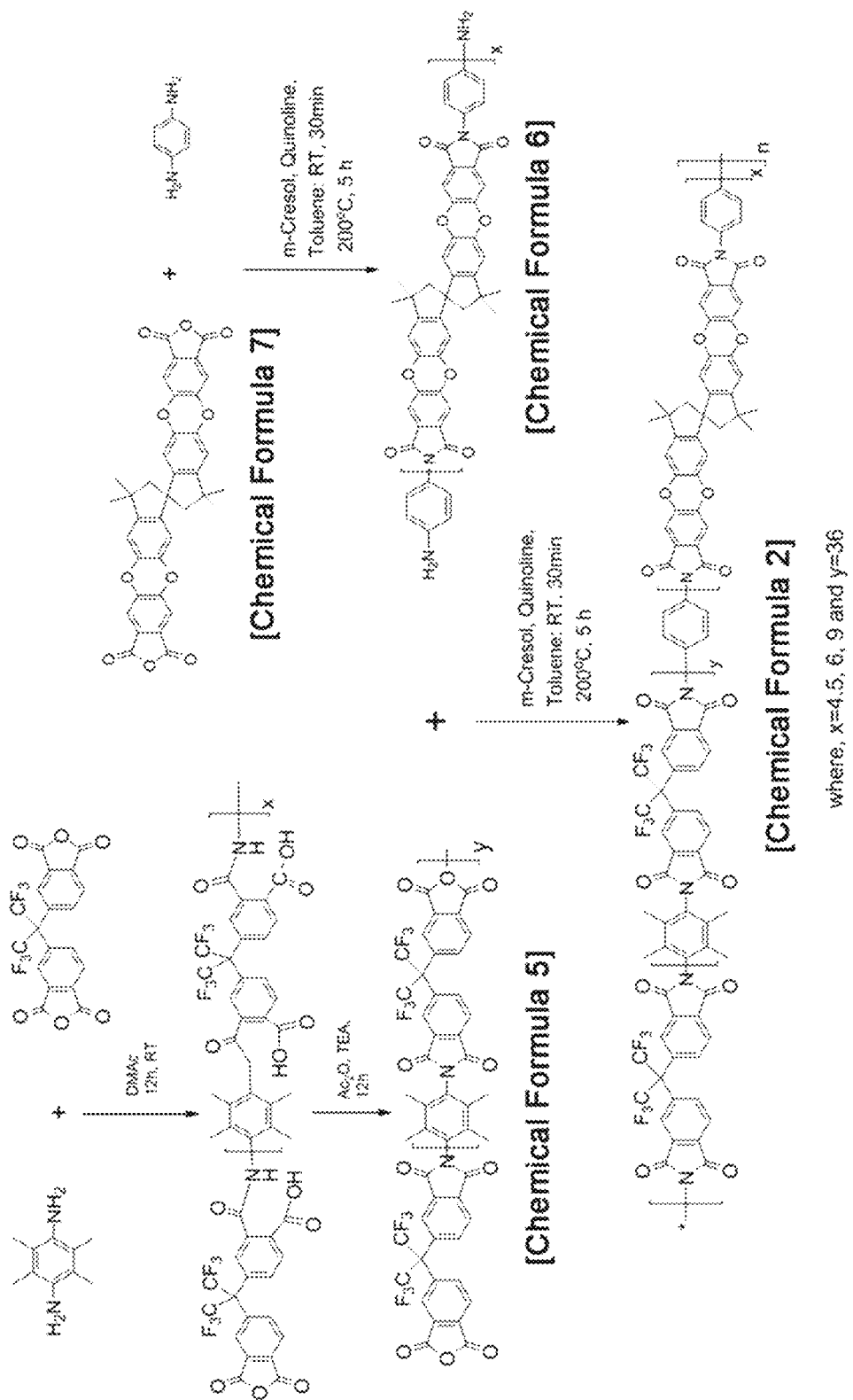
FIG. 3 is a reaction scheme illustrating the process for preparing a compound represented by [Chemical Formula 2] according to an embodiment.

The compound represented by [Chemical Formula 6] was prepared as depicted in FIG. 3. First, the compound represented by [Chemical Formula 7] (5.04 g, 8.02 mmol), 1,4-phenylene diamine (1.0 g, 9.25 mmol) and m-cresol (44 mL) were added to a round-bottom flask equipped with a Dean-Stark trap, nitrogen inlet and reflux condenser. The mixture was agitated at room temperature for 0.5 hours, and quinolone (0.44 mL) and dry toluene (9 mL) were added thereto. Then, the resultant mixture was warmed gradually to 200° C. and reaction was carried out at the same temperature for 6 hours. During this, water was removed through azeotropic distillation. The resultant viscous solution was cooled, diluted with chloroform (20 mL), and precipitated in vigorously agitated methanol (600 mL). The resultant solid precipitate was collected through filtration, purified with chloroform (20 mL) and reprecipitated with methanol (500 mL) to obtain a compound represented by [Chemical Formula 6] as light yellow-colored powder, which, in turn, was dried in a vacuum oven at 90° C. (yield: 91%).

Three compounds represented by [Chemical Formula 6] and having a different monomer ratio were prepared in the same manner.

[Mathematical Formula 1]

$$\overline{M_n} = \frac{M_o(1+r)}{1+r-2rp} \approx \frac{M_o(1+r)}{1-r}. \qquad (1)$$

wherein $\overline{M_n}$ is a target molecular weight; MO is the half of molecular weight of a repeating unit; r is the feed ratio of a monomer; and p is a reaction degree (=1).

$^1$H NMR for n=6: $\delta_H$ (400 MHz, CDCl$_3$); 7.55 (2H, br s, ArH), 7.41-7.31 (2H, brsignal, ArH), 7.17-7.07 (1.6H, brsignal, ArH), 6.98 (0.27H, brsignal, ArH), 6.78-6.68 (3.2H, brsignal, ArH), 6.64 (0.54H, br s, ArH, 6.37 (2H, br s, ArH, 3.80 (1H, br s, ArNH$_2$), 2.34-2.28 (2H, brd, CH$_2$), 2.20-2.16 (2H, brd, CH$_2$), 1.32-1.27 (12H, brsignal, CH$_3$).

ATR-FTIR (cm$^{-1}$): 3416&3356 (NH$_2$ stretching), 2944, 2854 (ArC—H), 1772 (imide C=O symmetric stretching), 1716 (imide C=O, asymmetric stretching), 1348 (imide C—N, stretching), 1060 (C—NH2 stretching), 740 (imide ring deformation).

$^1$H NMR for n=9: $\delta_H$ (400 MHz, CDCl$_3$); 7.55 (2H, br s, ArH), 7.41-7.31 (2H, brsignal, ArH), 7.17-7.07 (1.6H, brsignal, ArH), 6.98 (0.18H, brsignal, ArH), 6.78-6.68 (3.2H, brsignal, ArH), 6.64 (0.36H, br s, ArH, 6.37 (2H, br s, ArH, 3.80 (1H, br s, ArNH$_2$), 2.34-2.28 (2H, brd, CH$_2$), 2.20-2.16 (2H, brd, CH$_2$), 1.32-1.27 (12H, brsignal, CH$_3$).

ATR-FTIR (cm$^{-1}$): 3424&3360 (NH2 stretching), 2944, 2856 (ArC—H), 1772 (imide C=O symmetric stretching), 1712 (imide C=O asymmetric stretching), 1352 (imide C—N, stretching), 1060 (C—NH2 stretching), 740 (imide ring deformation).

$^1$H NMR for n=4.5: $\delta_H$ (400 MHz, CDCl$_3$); 7.55 (2H, br s, ArH), 7.41-7.31 (2H, brsignal, ArH), 7.17-7.07 (1.6H, brsignal, ArH), 6.98 (0.36H, brsignal, ArH, 6.78-6.68 (3.2H, brsignal, ArH), 6.64 (0.72H, br s, ArH), 6.37 (2H, br s, ArH), 3.80 (1H, br s, Ar—$NH_2$), 2.34-2.28 (2H, brd, $CH_2$), 2.20-2.16 (2H, brd, $CH_2$), 1.32-1.27 (12H, brsignal, $CH_3$).

ATR-IR ($cm^{-1}$): 3420&3346 ($NH_2$ stretching), 2948, 2852 (Ar—CH), 1770 (imide C=O, symmetric stretching), 1712 (imide C=O, asymmetric stretching), 1352 (imide C—N, stretching), 1060 (C—$NH_2$ stretching), 740 (imide ring deformation).

(6) Preparation of Compound Represented by [Chemical Formula 5]

The compound represented by [Chemical Formula 5] was prepared as depicted in FIG. 2. First, 6FDA (4.3 g, 9.68 mmol), durene (1.5 g, 24.76 mmol) and dimethyl acetamide (40 mL) were added to a round-bottom flask equipped with a nitrogen inlet and reflux condenser, and the reaction mixture was cooled at −5° C. (ice-bath) and agitated for 12 hours to form polyamic acid. Then, triethylamine (2.8 mL, 20 mmol) and acetic anhydride (1.9 mL, 20 mmol) were added to the reaction mixture and the resultant mixture was warmed to 110° C. (oil-bath) while agitating vigorously for 3 hours to complete polyimidization. The resultant viscous mixture was cooled at room temperature, dissolved in dimethyl acetamide (10 mL) and precipitated in methanol (200 mL). White polymer beads were collected through filtration, washed with deionized water many times, and dried under vacuum at 80° C. for 48 hours to obtain a compound represented by [Chemical Formula 5] as white solid beads (14.0114 g, yield: 98%).

$^1$H NMR: $\delta_H$ (400 MHz, $CDCl_3$) 8.08-7.98 (12H, brsignal, ArH), 7.97-7.82 (24H, brsignal, ArH), 7.75-7.68 (1H, brsignal, ArH), 7.47-7.61 (1H, brsignal, ArH) and 2.15-1.92 (72H, s, $CH_3$).

ATR-IR ($cm^{-1}$): 1784 (imide C=O, symmetric stretching), 1726 (imide C=O asymmetric stretching), 1352 (imide C—N, stretching), 728 (imide ring deformation).

(7) Preparation of Compound Represented by [Chemical Formula 2]

The compound represented by [Chemical Formula 2] was prepared as depicted in FIG. 2. The compound represented by [Chemical Formula 5], the compound represented by [Chemical Formula 6] and m-cresol were added. The mixture was agitated at room temperature for 0.5 hours, and quinolone and dry toluene were added thereto. Then, the mixture was warmed gradually to 200° C. and reaction was carried out at the same temperature. Three multi-block copolymers were prepared in the same manner, and they are different merely in viscosity.

The resultant viscous solution was cooled, diluted with chloroform and precipitated in vigorously agitated methanol. The resultant solid precipitate was collected through filtration, purified with chloroform and reprecipitated in methanol to obtain brown-colored beads, which, in turn was dried at 90° C. and purified to obtain a compound represented by [Chemical Formula 2].

$^1$H NMR for Block-1:4: Yield (89%); $\delta_H$ (400 MHz, $CDCl_3$) 8.11-8.03 (8H, brsignal, ArH), 8.0-7.9 (16H, brsignal, ArH), 7.59-7.55 (4H, br s, ArH), 7.35 (2H, s, ArH), 7.27 (2H, s, ArH), 6.71 (2H, s, ArH), 6.37 (2H, s, ArH), 2.34-2.28 (4H, m, $CH_2$), 2.19-2.04 (48H, brsignal, $ArCH_3$), 1.37-1.23 (12H, m, C $CH_3$).

GPC (DMF, RI)/Dap; $M_n 6.25 \times 10^4$, $M_w 8.14 \times 10^4$ and PDI-1.30.

ATR-IR (thin film $cm^{-1}$): 2960&2852 (Ar—CH), 1776 (imide C=O symmetric stretching)), 1724 (imide C=O asymmetric stretching), 1352 (imide C—N, stretching), 740 (imide ring deformation).

$^1$H NMR for Block-1:6: Yield (92%); $\delta_H$ (400 MHz, $CDCl_3$) 8.11-8.03 (12H, brsignal, ArH), 8.0-7.9 (24H, brsignal, $ArH_2$), 7.59-7.55 (4H, brs, ArH), 7.35 (2H, s, $ArH_c$), 7.27 (2H, s, ArH), 6.71 (2H, s, ArH), 6.37 (2H, s, ArH), 2.34-2.28 (4H, m, $CH_2$), 2.19-2.04 (72H, brsignal, $ArCH_3$), 1.37-1.23 (12H, m, $CCH_3$).

GPC (DMF, RI)/Da; $M_n 6.0 \times 10^4$, $M_w 8.08 \times 10^4$ and PDI-1.35.

ATR-IR (thin film $cm^{-1}$): 2960&2872 (Ar—CH), 1780 (imide C=O symmetric stretching), 1724 (imide C=O asymmetric stretching), 1344 (imide C—N, stretching), 744 (imide ring deformation).

$^1$H NMR for Block-1:8: Yield (87%); $\delta_H$ (400 MHz, $CDCl_3$) 8.11-8.03 (16H, brsignal, ArH), 8.0-7.9 (32H, brsignal, ArH) 7.59-7.55 (4H, br s, ArH), 7.35 (2H, s, ArH), 7.27 (2H, s, ArH), 6.71 (2H, s, $2^{L\lambda}ArH_e$), 6.37 (2H, s, ArH), 2.34-2.28 (4H, m, $CH_2$), 2.19-2.04 (96H, brsignal, $ArCH_3$), 1.37-1.23 (12H, m, $CCH_3$).

GPC (DMF, RI)/Da; $M_n 5.1 \times 10^4$, $M_w 6.55 \times 10^4$ and PDI-1.31.

ATR-IR (thin film $cm^{-1}$): 2952&2856 (Ar—CH), 1772 (imide C=O symmetric stretching), 1718 (imide C=O asymmetric stretching), 1352 (imide C—N, stretching), 740 (imide ring deformation).

TEST EXAMPLES

Manufacture of Membrane

All membranes were cast by spraying a solution (about 3 wt %) to a flat-bottom glass plate and carrying out evaporation gradually in a spherical box under nitrogen atmosphere at room temperature. The compound represented by [Chemical Formula 2] was dissolved in $CHCl_3$ (about 30 mg/mL), agitated overnight at room temperature, and filtrated by using cotton. The filtered solution was poured into a glass plate covered with aluminum foil having small holes and solvent evaporation was carried out under nitrogen atmosphere at room temperature for 3 days. Then, it was introduced to an oven and solvent evaporation was carried out at 70° C. for 24 hours. The resultant completely dried membrane was cooled at room temperature, separated from the glass plate, washed with methanol to remove the casting solvent, dried again in an oven at 70° C. for 24 hours, and then finally stored at room temperature. The membrane was controlled to have a thickness of 40-50 μm.

Test Example 1. NMR and IR Analysis

The compound represented by [Chemical Formula 5] was prepared through multicondensation between durene and 6FDA in such a manner that the target chain length may be y=35 by controlling the feed ratio of monomers. In addition, the repeating units of the compound represented by [Chemical Formula 6] were controlled to x=9, 6, 4 by adjusting the feed ratio of PDA monomers.

Figure 4:
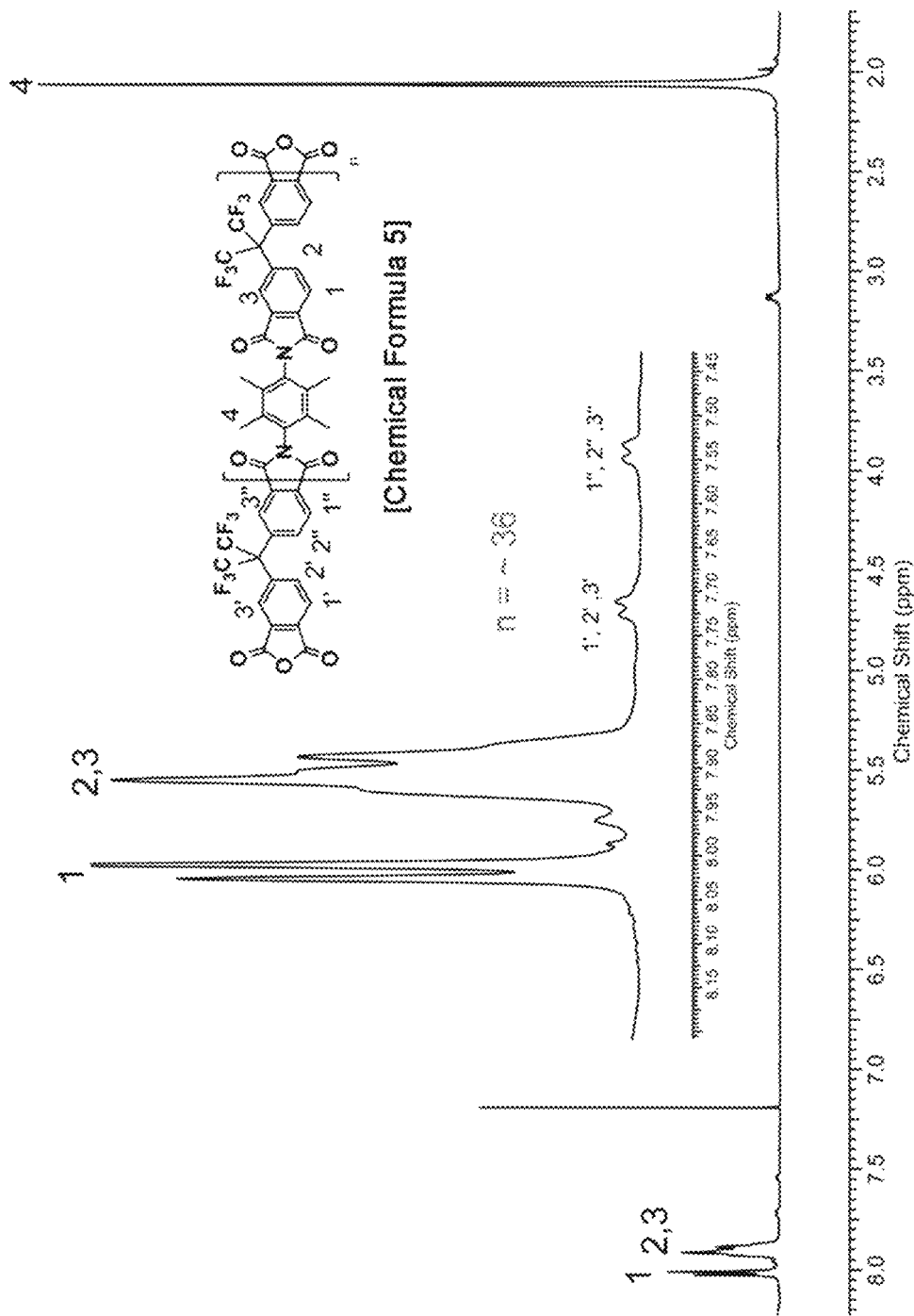
FIG. 4 shows $^1$H NMR of a compound represented by [Chemical Formula 5].
Figure 5:
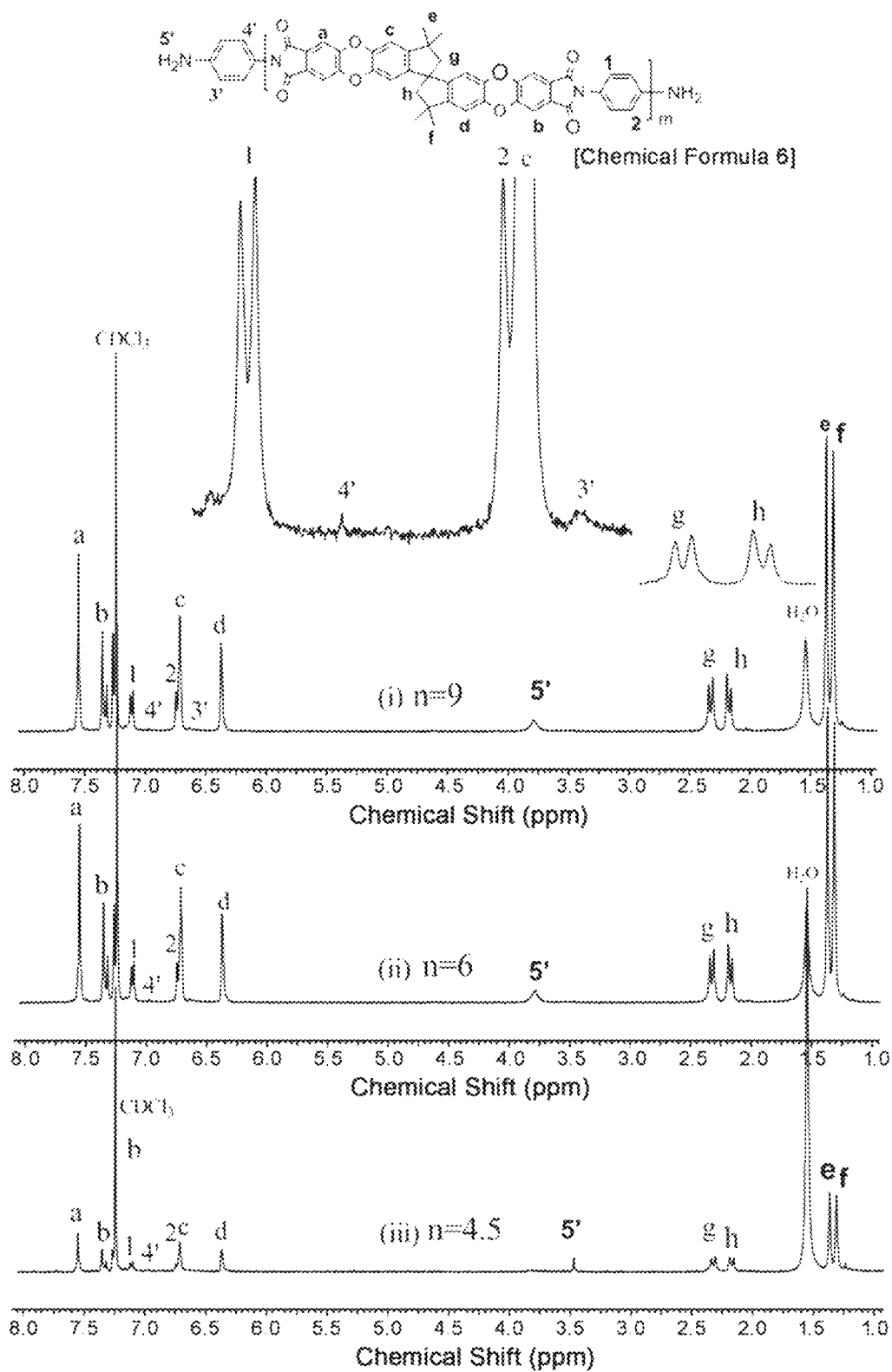
FIG. 5 shows $^1$H NMR of a compound represented by [Chemical Formula 6].

The length of a block (number of repeating units) is determined by comparison of the integral ratio of terminal groups to the backbone protons (FIG. 4 and FIG. 5).

The peaks corresponding to the terminal groups of the compound represented by [Chemical Formula 5] ($H_{1', 2', 3'}$ or $H_{1'', 2'', 3''}$) (FIG. 4) and the peaks corresponding to the terminal groups of the compound represented by [Chemical Formula 6] ($H_{3'}$ or $H_{4'}$) (FIG. 5) were observed by $^1$H NMR.

The accurate number of repeating units of the compound represented by [Chemical Formula 5] is calculated from the integral ratio of $H_{1,\,2,\,3}$ to $H_{1',\,2',\,3'}$ (or $H_{1,\,2,\,3}$ to $H_{1''',\,2''',\,3'''}$), and the accurate number of repeating units of the compound represented by [Chemical Formula 6] is calculated from the integral ratio of $H_1$ to $H_4$ (or $H_{2,\,c}$ to 3').

In all compounds represented by [Chemical Formula 6] having a different block length, the terminal amine peak $H_5$ shows formation of the amine terminal oligomer.

IR spectra (FIG. 6) correspond to $NH_2$. In the compound represented by [Chemical Formula 6], the characteristic peaks of the amine functional groups are not present in the compound represented by [Chemical Formula 2]. Thus, $^1H$ NMR and IR analysis demonstrates preparation of a successfully targeted oligomer in a conventional manner.

Figures 6, 7:
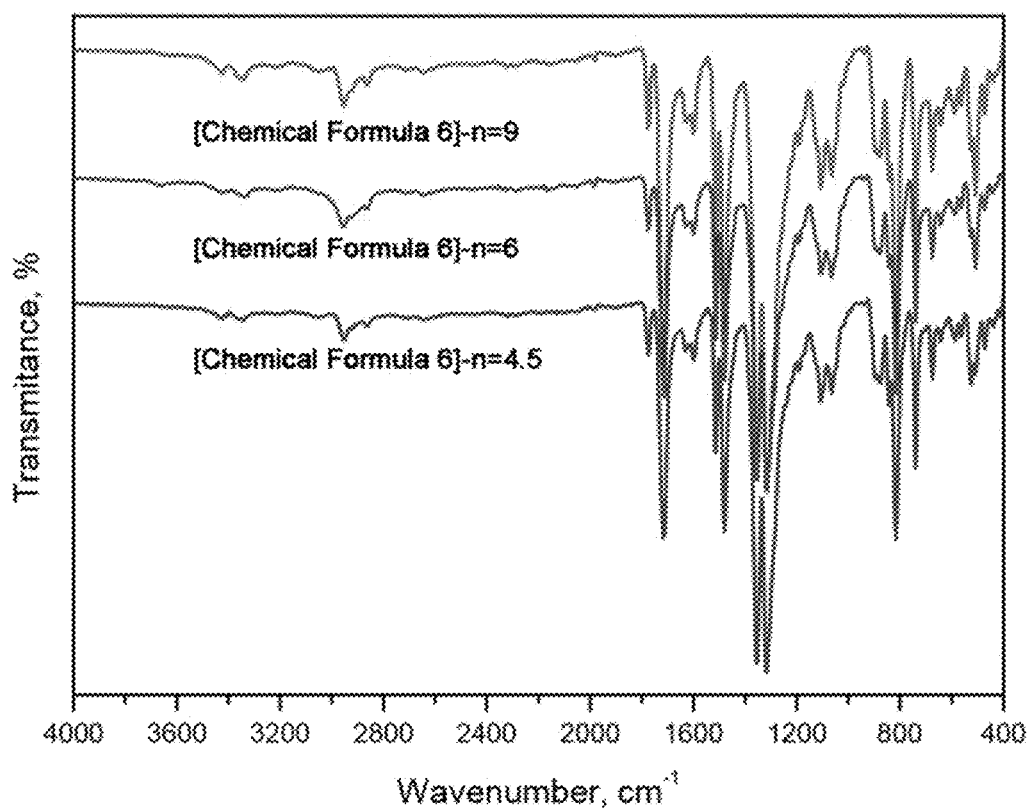
FIG. 6 shows Attenuated Total Reflection (ATR)-Fourier Transform Infrared (FTIR) spectrum of a compound represented by [Chemical Formula 6].
FIG. 7 illustrates calculation of experimental length of a compound represented by [Chemical Formula 5] and a compound represented by [Chemical Formula 6] from the supplying ratio.

It was found that the experimental length of each of the compound represented by [Chemical Formula 5] and the compound represented by [Chemical Formula 6] determined by $^1H$ NMR analysis coincides with each expected value (FIG. 7). It was possible to determine the number of repeating units by which the experimental length is determined through the comparison of the integral ratio between the terminal groups and backbone protons.

Test Example 2. Comparison of Three Block Copolymers Represented by [Chemical Formula 2]

Three block copolymers represented by [Chemical Formula 2] having a different block ratio (Block-1:4, Block-1:6 and Block-1:8) were prepared by combining two types of oligomer blocks (a compound of [Chemical Formula 5] and a compound of [Chemical Formula 6]) and having a different length (y=36, x=9; x=6, x=4.5) with each other.

Figure 8:
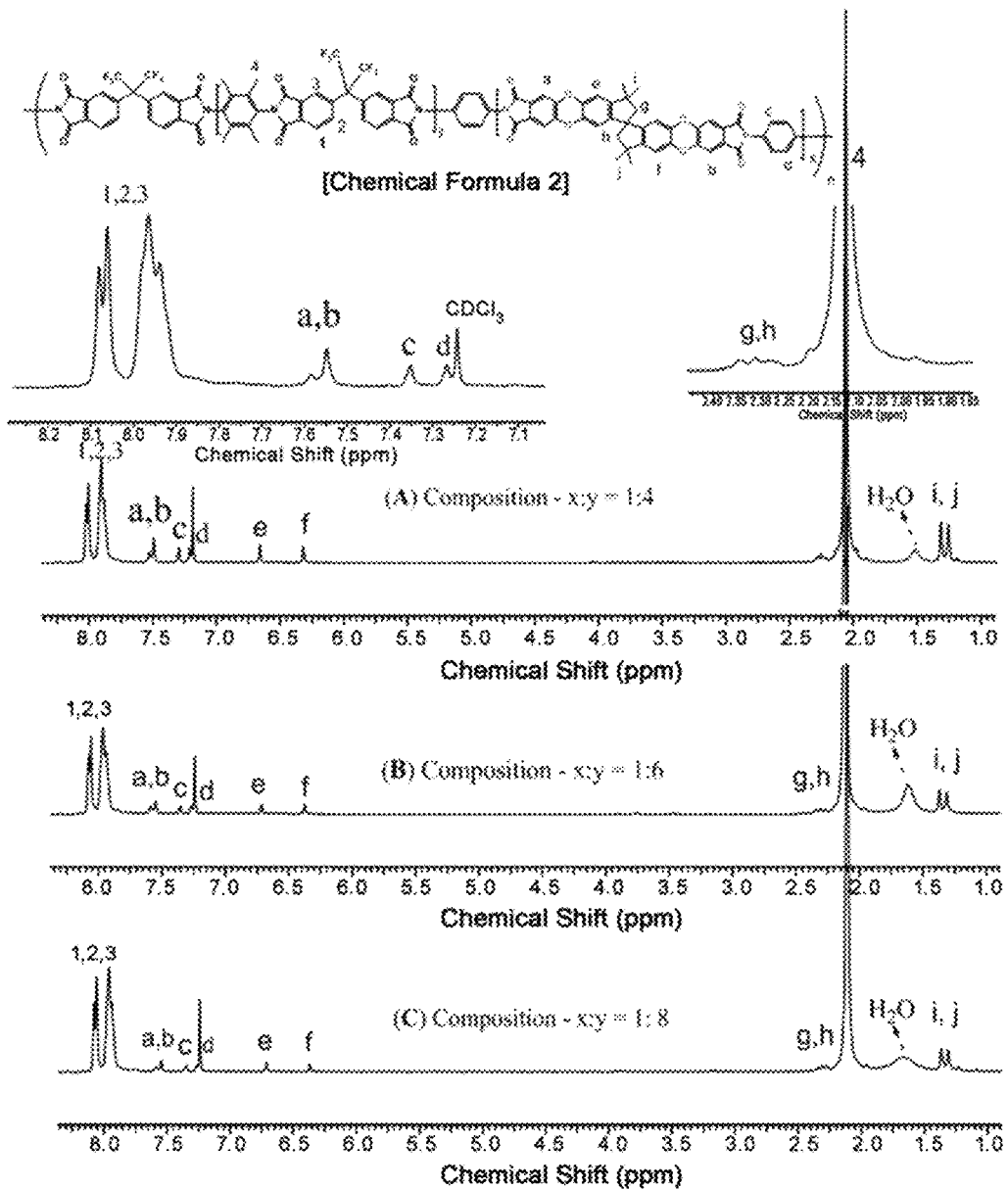
FIG. 8 shows $^1$H NMR of a compound represented by [Chemical Formula 2].

When $^1H$ NMR spectrum of the block copolymer represented by [Chemical Formula 2] was compared with that of the compound of [Chemical Formula 5] and that of the compound of [Chemical Formula 6], it was shown that each oligomer having a different length was polymerized successfully (FIG. 8). Particularly, the characteristic peaks of the compound of [Chemical Formula 5] and the compound of [Chemical Formula 6] were observed in $^1H$ NMR spectrum of the block copolymer of [Chemical Formula 2], except a part of functional groups disappearing due to the polymerization.

Through the comparison of the integral ratio between $H_{1,\,2,\,3}$ and $H_{a/b/e/f}$, three block copolymers represented by [Chemical Formula 2] (Block-1:4, Block-1:6 and Block-1:8) were observed.

The amine groups of the compound of [Chemical Compound 6] disappearing completely in the block copolymer having amine-terminated oligomer were exhausted by the formation of the block copolymer (FIG. 8).

Test Example 3. Characterization Using NMR and IR

Figure 9:
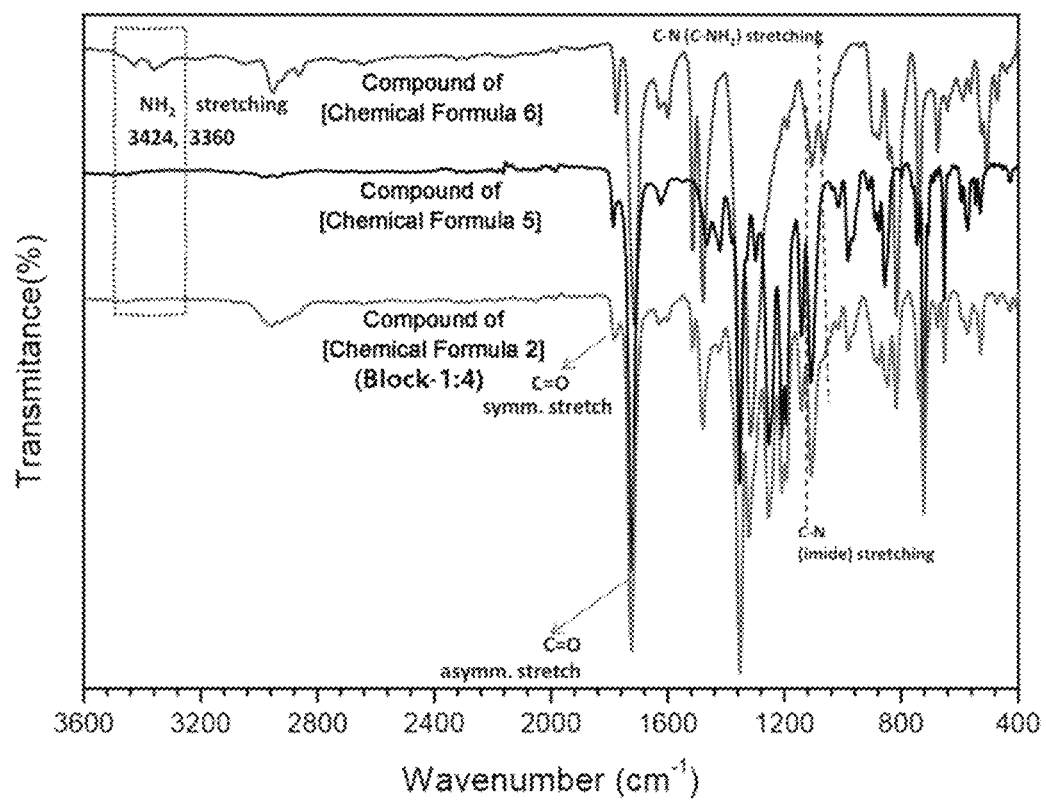
FIG. 9 shows ATR-FTIR spectrum of each of a compound represented by [Chemical Formula 2], a compound represented by [Chemical Formula 5] and a compound represented by [Chemical Formula 6]
Figures 10, 11:
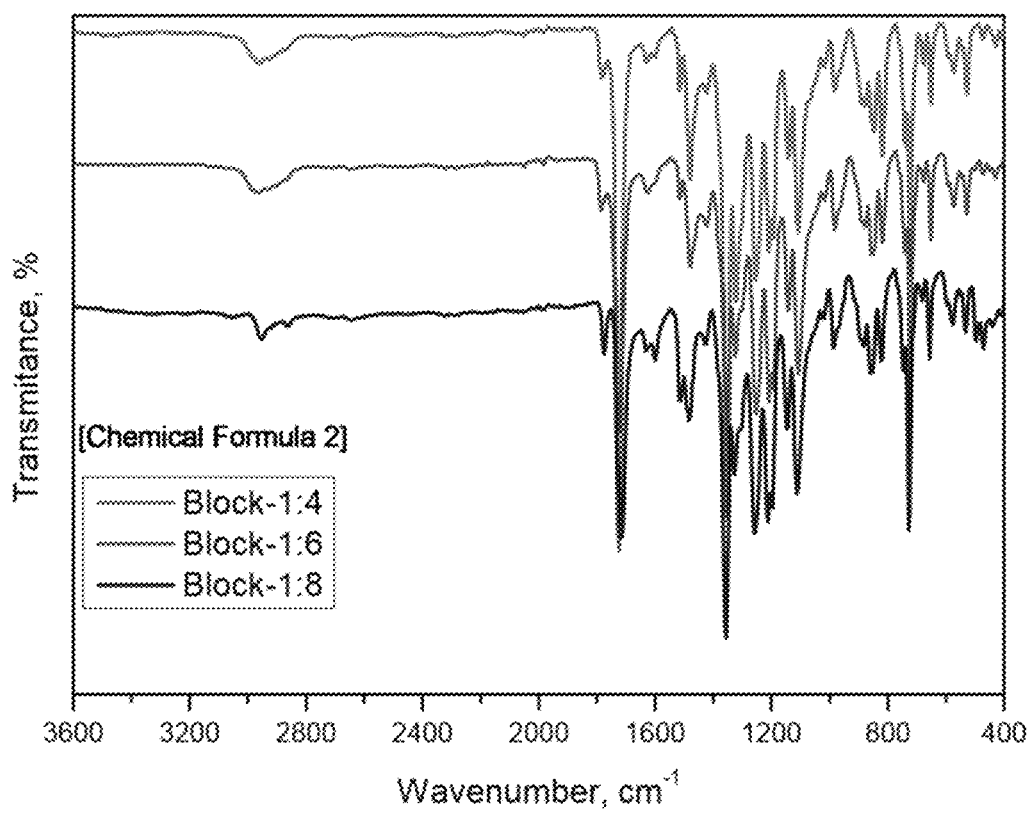
FIG. 10 shows ATR-FTIR spectrum of three compounds represented by [Chemical Formula 2] (Block-1:4, Block-1:6 and Block-1:8).
FIG. 11 shows physical properties of three compounds represented by [Chemical Formula 2] (Block-1:4, Block-1:6 and Block-1:8).

The above-mentioned three block copolymers represented by [Chemical Formula 2] (Block-1:4, Block-1:6 and Block-1:8) are characterized by $^1H$ NMR and ATR-FTIR spectrum (FIG. 6, FIG. 9 and FIG. 10).

As shown in FIG. 9, the IR peaks at 3424, 3360 and 1060 $cm^{-1}$ (FIG. 5, FIG. 6 and FIG. 9) corresponding to $NH_2$ stretching and C—$NH_2$ stretching disappear in all types of block copolymers, suggesting that the block copolymers represented by [Chemical Formula 2] are copolymerized successfully.

Meanwhile, as determined by gel permeation chromatography (GPC), the molecular weight (Mn) and polydispersity index (PDI, $M_w/M_n$) of each of the three block copolymers represented by [Chemical Formula 2] (Block-1:4, Block-1:6 and Block-1:8) are 51000-62500 kDa and 1.30-1.35 (FIG. 11).

Test Example 4. Characteristics

Each of the three block copolymers represented by [Chemical Formula 2] (Block-1:4, Block-1:6 and Block-1:8) was determined for its solubility in various solvents (FIG. 12).

All block copolymers represented by [Chemical Formula 2] show high solubility in a low-boiling point solvent, such as $CHCl_3$, $CH_2Cl_2$ and THF, but are hardly soluble in DMSO, DMAc and DMF.

Figure 14:
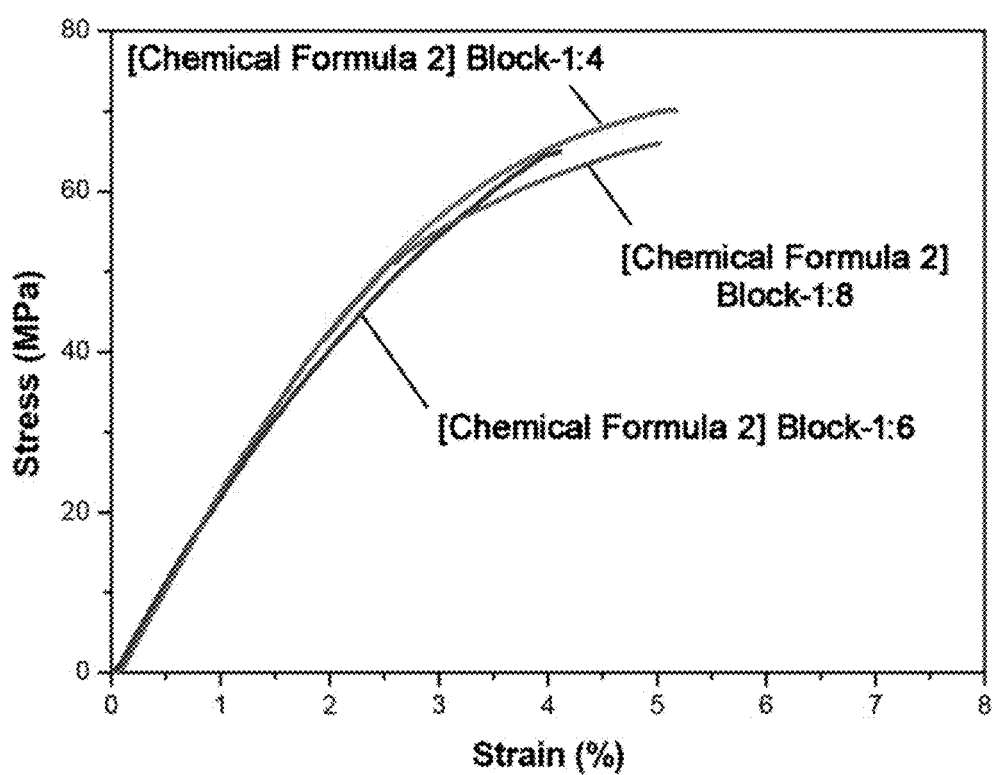
FIG. 14 shows stress-strain (s-s) curves of three compounds represented by [Chemical Formula 2] (Block-1:4, Block-1:6 and Block-1:8).

Meanwhile, it can be seen that the membrane manufactured by using the three block copolymers represented by [Chemical Formula 2] (Block-1:4, Block-1:6 and Block-1:8) shows high flexibility and high mechanical strength (FIG. 13 and FIG. 14), and may be used for a gas permeation test.

Figure 15:
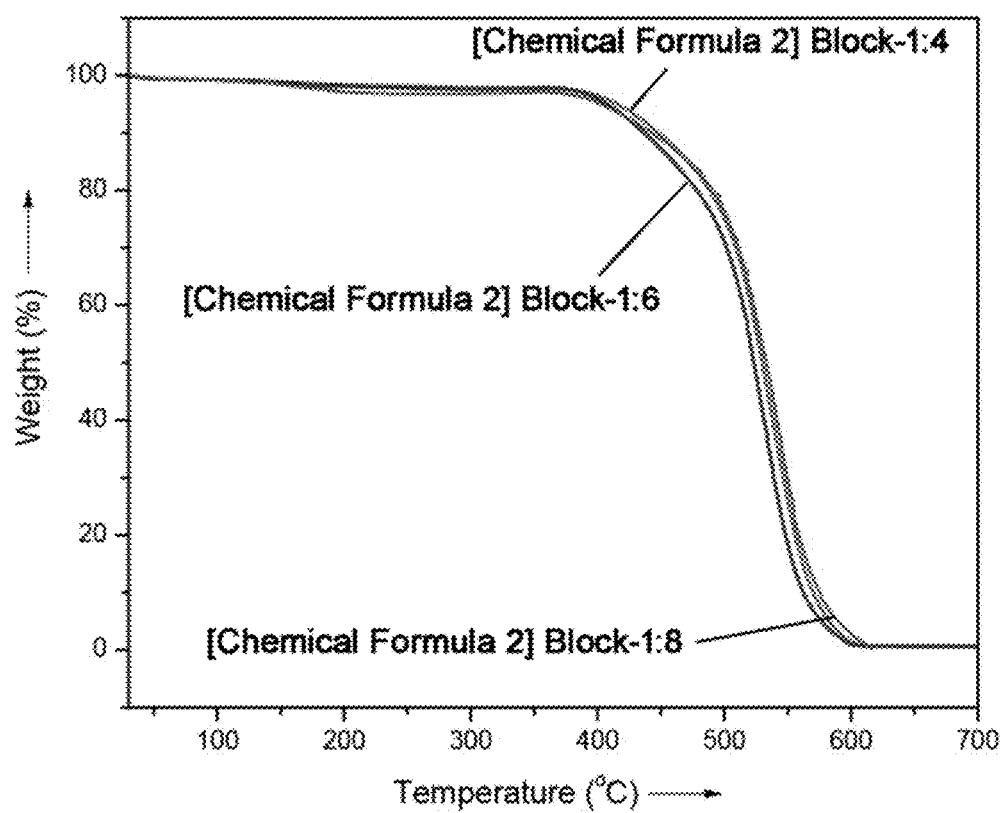
FIG. 15 shows thermal gravimetric analysis (TGA) curves of three compounds represented by [Chemical Formula 2] (Block-1:4, Block-1:6 and Block-1:8).

In addition, it was shown that the membrane according to the present disclosure showed higher performance as compared to the PIM- and PIM-PI-based polymers according to the related art by combined virtue of high-density 6FDA-durene. It was also shown that the membranes according to the present disclosure showed high thermal stability with a high decomposition temperature of about 500° C. or higher (FIG. 15).

Test Example 5. Nitrogen Adsorption/Desorption Analysis

Figure 16A:
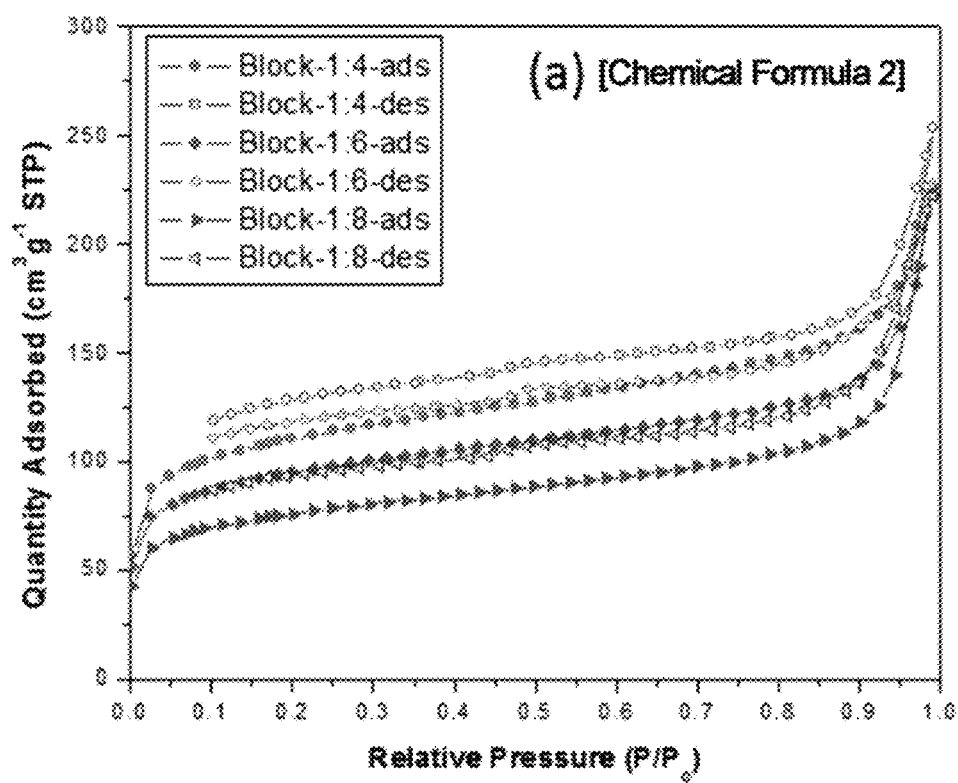
FIG. 16A shows nitrogen adsorption/desorption curves of three compounds represented by [Chemical Formula 2] (Block-1:4, Block-1:6 and Block-1:8), as determined at 77° K by using nitrogen.

FIG. 16A shows a nitrogen adsorption/desorption curve of three block copolymers determined at 77° K by using nitrogen as a probe molecule.

Open hysteresis loops were observed for all of the block copolymers by the irreversible adsorption/desorption curve. A broad range of micro- and meso-porous polymers and hysteresis loop characteristics have been observed frequently in other groups.

Rapid nitrogen absorption in an isothermal adsorption curve under relatively low pressure suggests the presence of interconnected micropores defined by IUPAC (pore size<2 nm) in a block copolymer. In addition, nitrogen adsorption increasing gradually under relatively high pressure results from the meso structure, macro structure and interfacial pores of a polymer, which function like macropores.

Since the adsorption curve of Block-1:4 is located substantially above the adsorption curves of Block-1:6 and Block-1:8, it can be seen that the ratio of interconnected micropores of Block-1:4 block copolymer is significantly higher. Such a type of hysteresis may result from a swellable polymer matrix, capillary condensation or limited emission of nitrogen molecules closed from a narrow pore channel or non-permeable pore structure (pores having a small pore size and an ink bottle-like shape).

Block-1:4 block copolymer shows relatively narrow hysteresis as compared to the other two block copolymers. This may be because the symmetric pore structure of block-1:4 polymer is larger as compared to the other block copolymers.

The presence of micropores and macropores may be determined by a pore size distribution (PSD) curve interfered from the isothermal nitrogen adsorption curve (FIG. 16B) by using the non-local density function theory (NLDFT). Predominant pore size distribution is present in the mesopore range (2-50 nm) and micropore range (about 2 nm).

Block-1:4 block copolymer shows both pore distributions predominantly as compared to the other two block copolymers. Thus, it can be seen that the effect of combining a higher portion of PIM-PI with fine pores caused by interfacial microphase separation may occur between different oligomers having a large block length.

Figures 16B, 17:
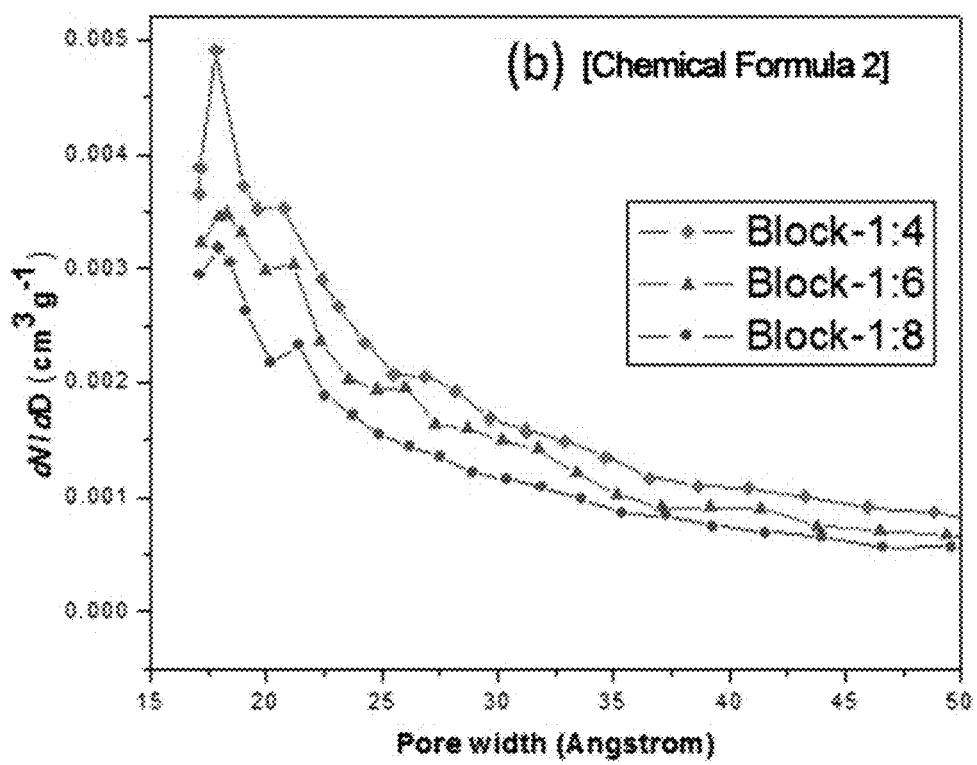
FIG. 16B shows pore width distribution curve calculated by NLDFT method for curves of three compounds represented by [Chemical Formula 2](Block-1:4, Block-1:6 and Block-1:8).
FIG. 17 shows BET surface area of each of three compounds represented by [Chemical Formula 2] (Block-1:4, Block-1:6 and Block-1:8).

Meanwhile, BET surface area of each of the three block copolymers represented by [Chemical Formula 2] (Block-1:4, Block-1:6 and Block-1:8) is shown in FIG. 17.

Block-1:4 block copolymer (SSA~397 $m^2/g$) has a larger BET surface area as compared to the other two block copolymers.

Excellent gas separation characteristics may be expected from a high BET surface area and micropore and macropore distribution. In a gas permeability test, as discussed in the gas separation section, a higher surface area corresponds to high permeability.

In addition, Block-1:4 block copolymer has higher diffusibility as compared to the other two block copolymers, since the pore volume and diameter are higher as compared to Block-1:6 and Block-1:8.

Test Example 6. Morphological Analysis Based on WAXD

Wide angle X-ray diffractometry (WAXD) is essential for determination of crystallinity and intermolecular space buy using the Bragg's Law.

$$d = \frac{\lambda}{2\sin\theta} \quad \text{[Chemical Formula 2]}$$

wherein $\lambda$ is a wavelength and $\theta$ is a scattering angle.

Figure 18:
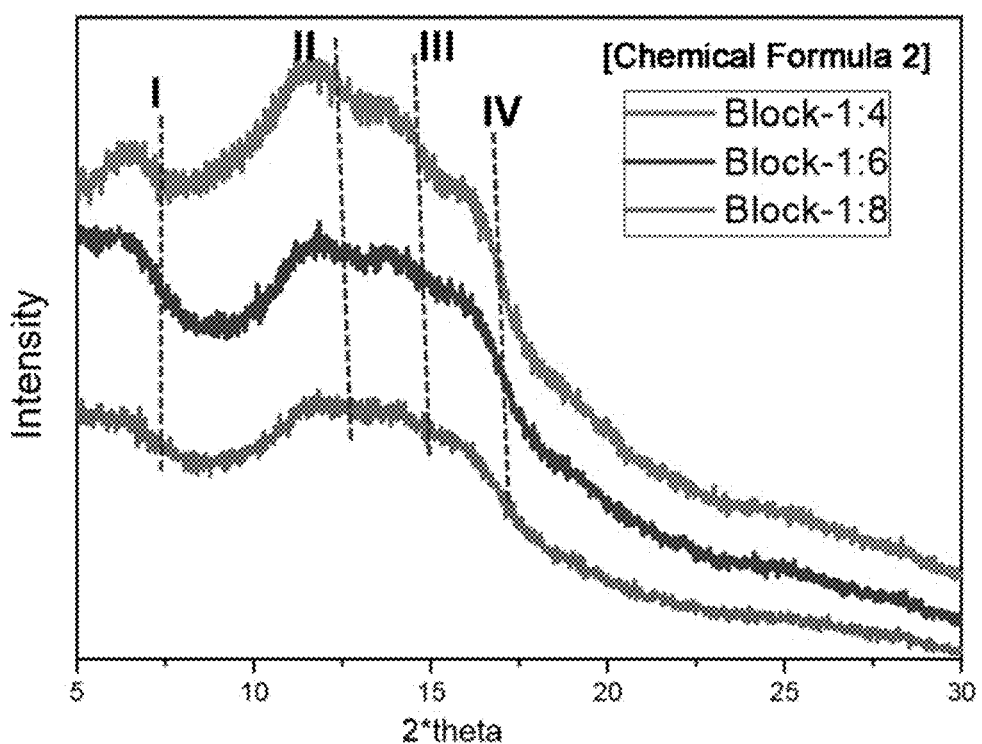
FIG. 18 shows morphological analysis results of three compounds represented by [Chemical Formula 2] (Block-1:4, Block-1:6 and Block-1:8).

As shown in FIG. 18, the microstructure of the block copolymer according to the present disclosure was examined by WAXD.

Broad distribution of WAXD suggests that three membranes (Block-1:4, Block-1:6 and Block-1:8) are essentially amorphous. Although four peaks are observed with a difference in intensity and a slightly different 2θ value in two membranes (Block-1:4, Block-1:6), the peak intensity of Block-1:8 membrane is not differentiated clearly. All peaks were observed as broad signals.

This may result from the short chain length of the compound (PIM-PI) of [Chemical Formula 6], and thus a significantly small proportion of the compound of [Chemical Formula 6] in the samples containing the compound of [Chemical Formula 6] distributed randomly in the compound of [Chemical Formula 5].

The first peak I at a d-spacing of about 13 Å corresponds to the distance of an extended form of spiro-carbon atoms, which is about 10-15 Å to the compound (PIM-PI) of [Chemical Formula 6]. The third peak III observed at about 6.3 Å corresponding to a loosely packed polymer chain results from a polymer retaining the shape of micropores between chains.

Block-1:4 membrane showed that the maximum intensities of the two peaks represent a structure different from the structures of the other two block copolymers.

The fourth peak IV at a higher angle having a low d-spacing (about 5.5 Å) may result from the chain-chain distance of a chain with which the space between backbones is packed efficiently. All three peaks are observed in a classical PIM-based structure in documents. Peak II appearing more strongly as compared to Block-1:4 membrane at a d-spacing of about 7.7 Å (Block-1:6 is observed slightly) results from the interfacial micro-distance between two different monomers ([Chemical Formula 5] and [Chemical Formula 6])

Peak II shows a distinct structure of Block-1:4 block copolymer as described above, and this will be demonstrated hereinafter.

Test Example 7. Morphology Based on AFM

The atomic force microscopic (AFM) image of the block copolymer according to the present disclosure is obtained by the tab analysis of the surface.

Figure 19:
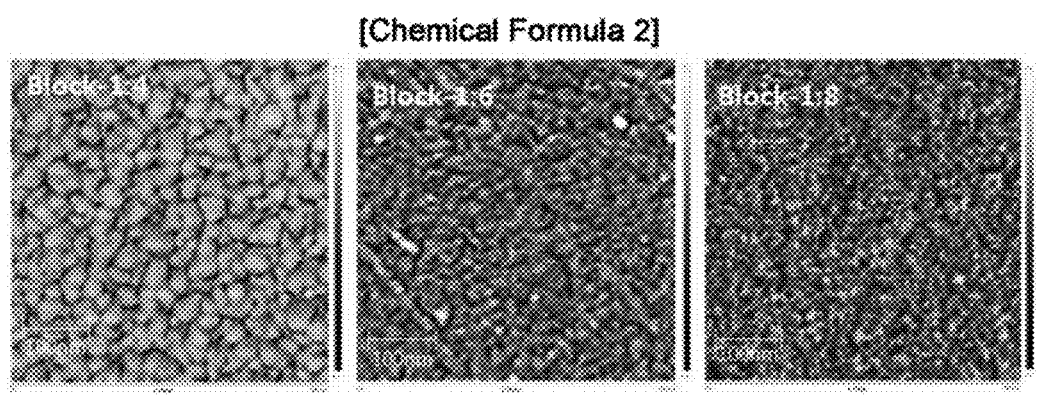
FIG. 19 shows atomic force microscopic (AFM) images of three compounds represented by [Chemical Formula 2] (Block-1:4, Block-1:6 and Block-1:8).
Figure 25:
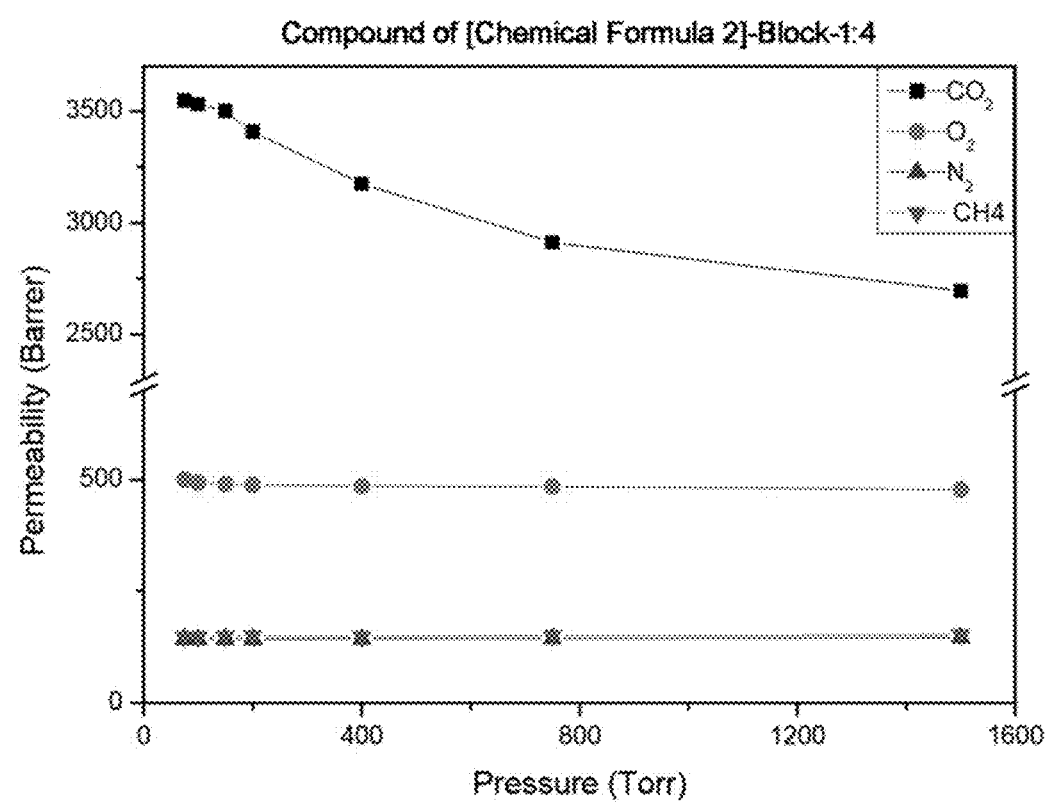
FIG. 25 shows permeability values of a compound represented by Chemical Formula 2 (Block-1:4) depending on pressure and gas type.
Figure 26:
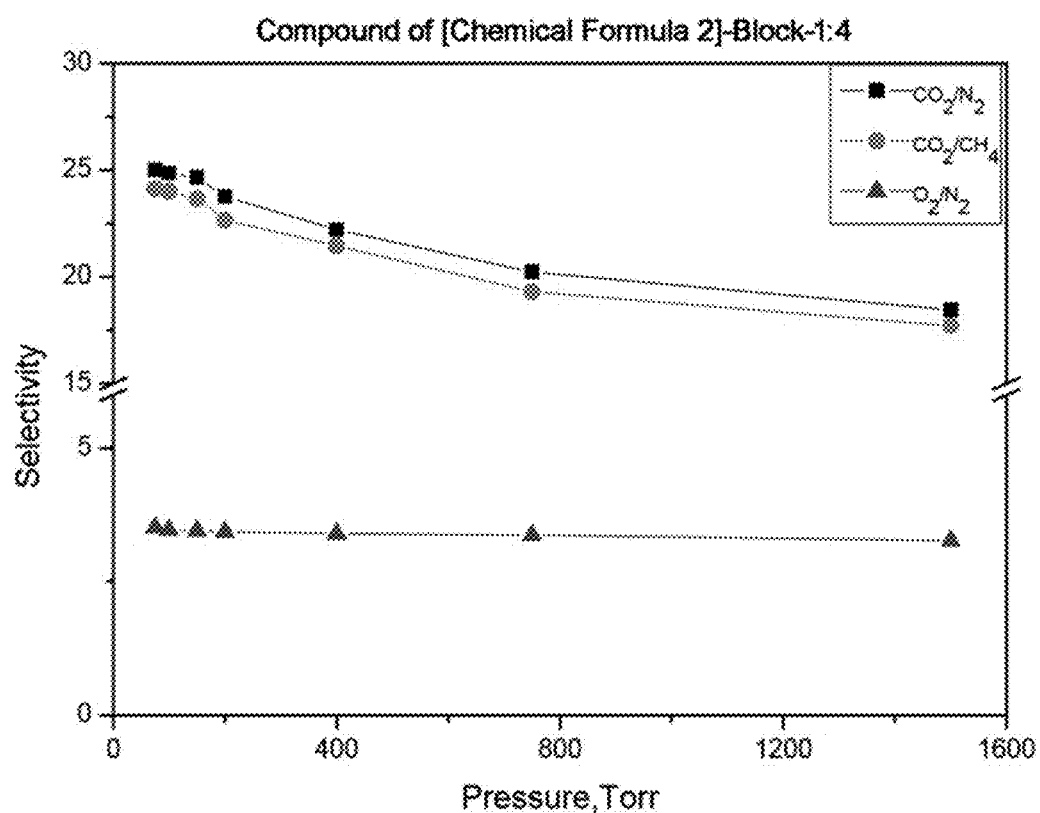
FIG. 26 shows selectivity values of a compound represented by Chemical Formula 2 (Block-1:4) depending on pressure and gas type.

FIG. 19 shows AFM images of three block copolymers (Block-1:4, Block-1:6 and Block-1:8) of [Chemical Formula 2] having a different block length. The light portion and the dark portion of each image correspond to a hard segment and a soft segment, respectively.

Block-1:4 membrane shows a clear phase-separated structure in a micro-scale, which is not clear in Block-1:6 and Block-1:8 membranes.

Improvement of interconnectivity of a highly permeable domain was observed in a multi-block system (Block-1:4) having a large block length.

The gas transport property of a block copolymer varies with the particular type of the block copolymer. Particularly, high interconnectivity increases a diffusion coefficient, thereby improving overall gas transport performance. On the other hand, a decrease in interconnectivity results in degradation of effective diffusion.

Even in the case of chemically similar oligomers, a significantly small difference may cause strong repulsion between polymers due to the unit number and molecular weight of chains, when phase separation occurs. Microphase separation is generated as separation in a local scale due to the disaccordance between different blocks (intermolecular force between repulsing molecules and restorative force).

The length of a highly permeable length is in the order of Block-1:4>Block-1:6>Block-1:8. As a result, it was not possible to observe any microphase separation in Block-1:6 and Block-1:8 membranes (FIG. 19).

However, in the case of Block-1:4 membrane, it provides high permeability, has a large block length and shows a separated form caused by micro-interaction.

Therefore, high gas transport property can be expected from the block copolymer (Block-1:4) including a form of interconnected microphase separation.

Test 8. Pure Gas Separation

Gas permeability and selective permeability are important characteristics of a gas separation membrane.

A pure gas permeation test for Block-1:4, Block-1:6 and Block-1:8 membranes to $N_2$, $O_2$, $CH_4$ and $CO_2$ gases was carried out by using a constant volume/variable pressure time lag apparatus at 30° C. under a pressure of 2 atm. The measured permeability (P) and calculated ideal selectivity (α) are shown in FIG. 20. In addition, a diffusion coefficient (D) and solubility parameter (S) derived from a solution diffusion model (S=P/D) are shown in FIG. 21.

Data were compared with the values of compound of [Chemical Formula 6] (PIM-PI) and Random-1:4 membrane (mixed with [Chemical Formula 5] and [Chemical Formula 6] at the same ratio), in the same manner as Block-1:4 membrane.

In all membranes, the order from the highest diffusion coefficient to the lowest diffusion coefficient is $O_2>CO_2>N_2>CH_4$ (FIG. 20), which does not conform to the order of gas dynamic diameter, such as C02 (3.30 Å)<$O_2$ (3.46 Å)<$N_2$ (3.64 Å)<$CH_4$ (3.80 Å). However, the order of permeability form the highest value to the lowest value is $CO_2>O_2>CH_4>N_2$, except Block-1:8 in which $CH_4<N_2$.

Diffusibility of carbon dioxide is lower than that of oxygen due to higher interaction between a polymer (low desorption ratio) and carbon dioxide as compared to low interaction between a polymer and oxygen. However, overall carbon dioxide permeability reached to the maximum by the solubility of carbon dioxide which is 11-14 times higher than the solubility of oxygen. For the same reason, $P_{CH4}$ is higher than $P_{N2}$, since the solubility of $CH_4$ (in the case of Block-1:4 and Block-1:6) is higher than the solubility of nitrogen (FIG. 22). In other words, such higher solubility selectivity ($S_{CH4/N2}$) of methane as compared to nitrogen exceeds higher diffusion selectivity ($D_{N2/CH4}$) of nitrogen as compared to methane, and thus improves higher permeability of methane rather than nitrogen.

On the contrary, in the case of Block-1:8 membrane, it was shown that $D_{N2/CH4}$ is higher than $S_{CH4/N2}$ which accelerates high permeability of nitrogen as compared to methane (FIG. 22).

The above results are clear, since it is well known that polyimide is differentiated generally by a separation coefficient, $\alpha_{(N2/CH4)}>1$. On the other hand, the factor is less than 1 in most of the other polymers containing highly permeable PIM and PIM-PI. Solubility separation prefers $CH_4$ (methane) to $N_2$.

For each gas, the permeation order is Block-1:4>Block-1:6>Block-1:8, and the results are in accordance with the results of nitrogen adsorption and BET surface.

With reference to the selectivity of a block copolymer, Block-1:4 membrane is the highest by virtue of high solubility selectivity of interconnected micropores of the block copolymer. As compared with the existing polyimide membrane, the block copolymer membrane according to the present disclosure shows significantly improved gas separation performance.

Particularly, Block-1:4 membrane accomplished the maximum carbon dioxide permeability up to 2694 Barrer ( 이게 맞는지 확인 부탁드립니다 ) at 2 atm. In addition to such high permeability, Block-1:4 membrane shows excellent selectivity to $CO_2/CH_4$ and $CO_2/N_2$ gas pairs.

In addition, Block-1:4 was examined for its separation performance under various pressure ranges (100-200 mbar) (FIG. 23).

At a low pressure (100-200 mbar), dramatic gas separation results were obtained with a permeability $P_{CO2}=3547$ and a selectivity $\alpha_{CO2/N2}=25$ and $\alpha_{CO2/CH4}=24.1$. The results are significantly better as compared to each of the compound of [Chemical Formula 5] and compound of [Chemical Formula 6]. It is though that this results from the micro-interface between two different blocks. Such a type of interphase separation forms interconnected pores which connect a larger number of permeation steps with each other and improve gas diffusibility by virtue of a decrease in curvature of a permeation path.

In terms of all of the above-mentioned characteristics, gas permeability, BET surface area and d-spacing are better in the order of Block-1:4>Block-1:6>Block-1:8. In other words, the order is the same as an increment of the compound of [Chemical Formula 6] (PIM-PI).

Although the compound of [Chemical Formula 5] and the compound of [Chemical Formula 6] are hard polymers, the compound of [Chemical Formula 6] (PIM-PI) is separated microscopically from the compound of [Chemical Formula 5] (6FDA-Durene) with a longer chain due to different chemical properties. As the length of the compound of [Chemical Formula 6], it is distributed randomly in the compound of [Chemical Formula 5] with a longer chain to form block copolymers randomly, and microphase separation is not predominant to form Block-1:8 randomly.

Block-1:4 membrane shows higher performance as compared to the other two block copolymer membranes. This is because gas permeation of the block copolymer occurs preferentially through most permeable phases.

Test Example 9. Pressure Effect

Under significantly low pressure, nitrogen adsorption performance was examined by studying gas permeability in a low pressure range of 100-200 mbar. The results are shown in FIG. 23 to FIG. 26.

Permeability of carbon dioxide is decreased as the pressure is increased, but permeability of $O_2$, that of $N_2$ and that of CH are similar. In other words, $CO_2/N_2$ and $CO_2/CH_4$ perm-selectivity is decreased. Due to a decrease in solubility under high pressure caused by filling of the Langmuir adsorption sites under high pressure, permeability is decreased as the pressure is increased.

Diffusibility increasing under high pressure is expected from a high pressure gradient between the feed side and permeation side of a membrane and decreased gas interaction with a polymer material.

Referring to the overall results under a low pressure range, high $CO_2$ permeability ($P_{CO2}=3547$ Barrer at 100 mbar) and high selectivity of $CO_2$ to $N_2$ and $CH_4$ (e.g., $\alpha_{CO2/N2}=25$ and $\alpha_{CO2/CH4}=24.1$ at 10 kPa).

Figure 27A:
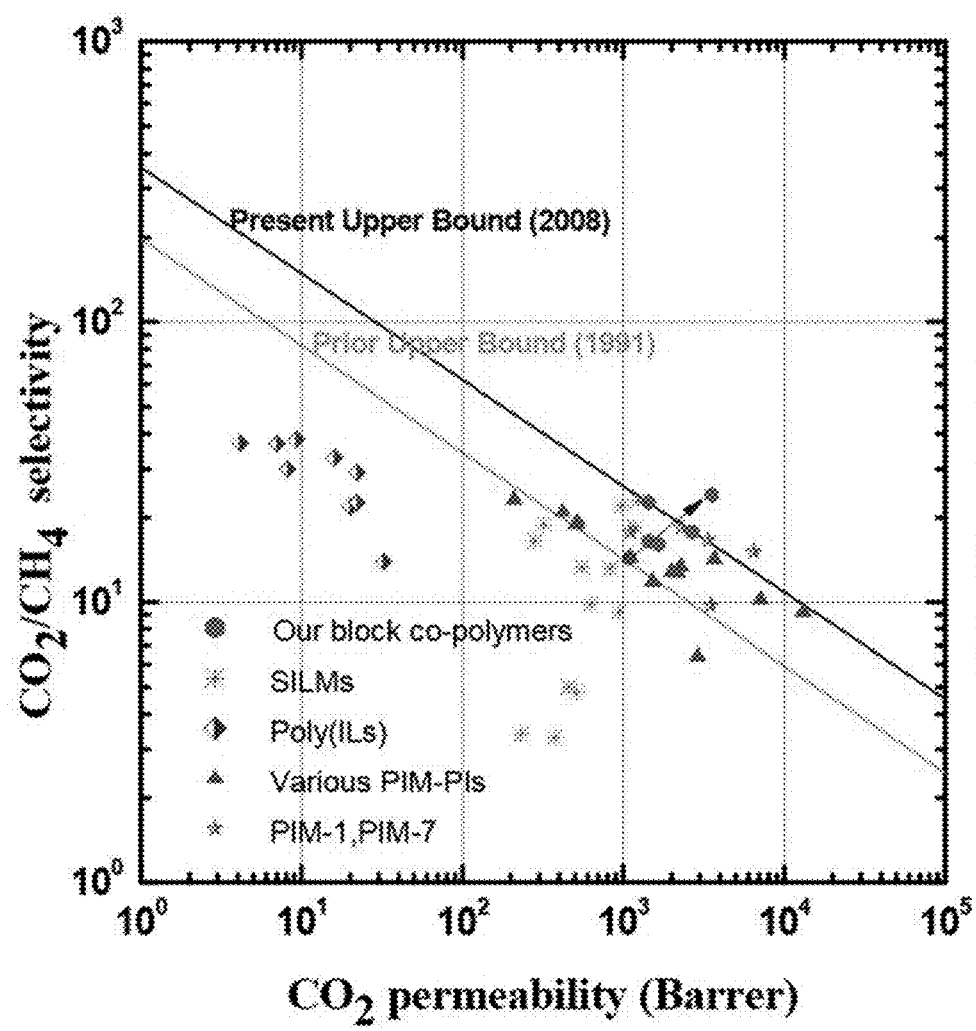
FIG. 27A shows the Robeson plot of P vs. α with regard to a $CO_2/CH_4$ gas pair for a compound represented by Chemical Formula 2 (Block-1:4) depending on pressure and gas type.
Figure 27B:
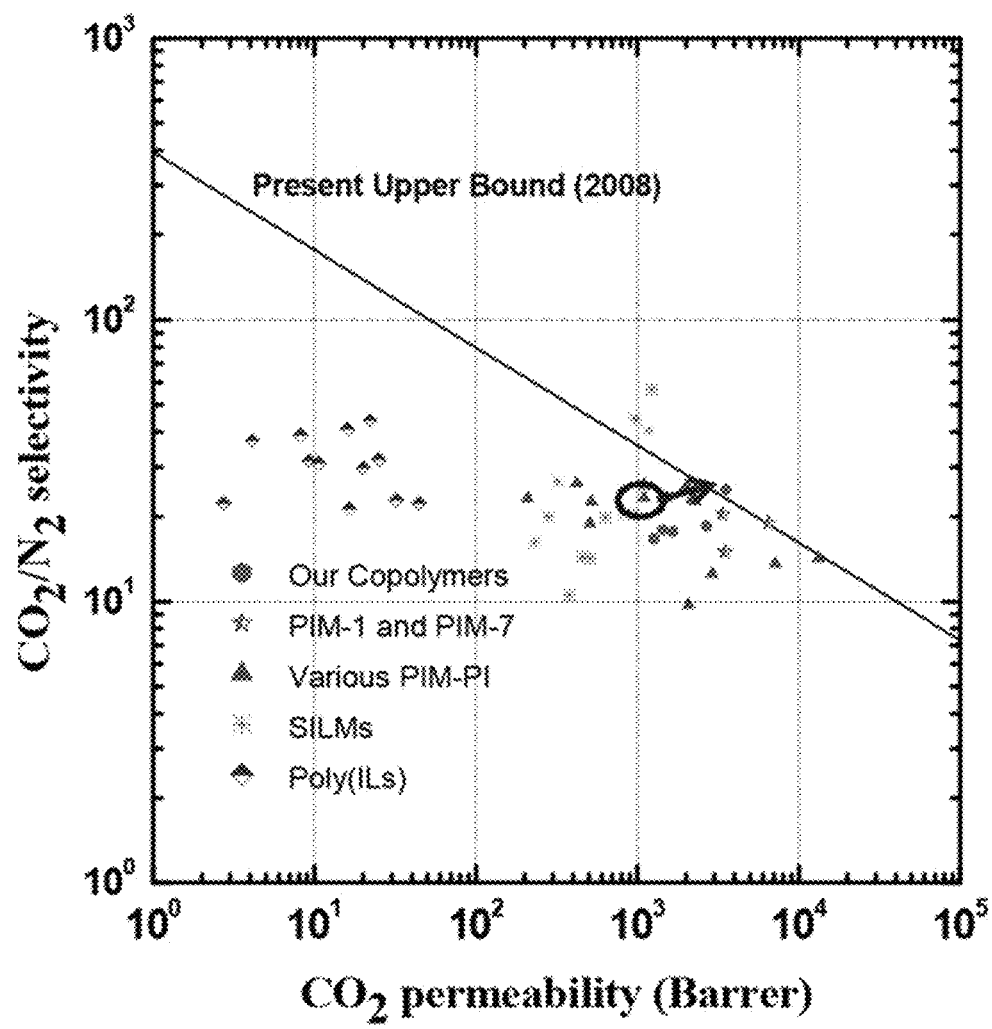
FIG. 27B shows the Robeson plot of P vs. α with regard to a $CO_2/N_2$ gas pair for a compound represented by Chemical Formula 2 (Block-1:4) depending on pressure and gas type.

The Robeson plots of P vs. α for the gas pairs of $CO_2/CH_4$ and $CO_2/N_2$ are shown in FIG. 27A and FIG. 27B.

Block-1:4 membrane surpasses the 2008 Robeson plots for $CO_2/CH_4$ and $CO_2/N_2$ gas pairs under low pressure, is positioned on the 2008 Robeson plot of a $CO_2/CH_4$ gas pair, and is positioned near the boundary of the 2008 Robeson plot of a $CO_2/N_2$ gas pair under high pressure.

In addition, the performance of Block-1:8 membrane is positioned on the 2008 Robeson plot and that of Block-1:6 membrane is on the upper limit of the 2008 Robeson plot for $CO_2/CH_4$.

To compare a block copolymer with a random copolymer in terms of gas separation performance, a random copolymer (e.g., Random-1:4) having the same composition as Block-1:4 block copolymer (compositional ratio of compound of [Chemical Formula 6]:compound of [Chemical Formula 5]=1:4) was prepared.

It was shown that the random copolymer showed lower performance as compared to Block-1:4 block copolymer. Moreover, the performance of the random copolymer is lower than that of the block copolymer which shows the lowest performance among the block copolymers according to the present disclosure.

According to the present disclosure, three block copolymers were prepared. These are block copolymers including thermally and mechanically rigid 6FDA-durene polyimide combined with highly permeable PIM-PI.

The gas separation test demonstrated that a block copolymer having a large chain length shows high permeability and high selectivity for $CO_2/CH_4$ and $CO_2/N_2$ by virtue of high microporosity of interconnected pores.

Particularly, the performance of Block-1:4 block copolymer surpasses the upper limit of the 2008 Robeson plot for $CO_2/CH_4$ and $CO_2/N_2$ pairs under low pressure; and the performance thereof is positioned on the upper limit boundary of the 2008 Robeson plot for $CO_2/CH_4$ and is positioned near the upper limit boundary of the 2008 Robeson plot for $CO_2/N_2$ under high pressure.

High $N_2$ absorption in the low-pressure performance under the conditions of significantly low pressure, high BET surface area and pure gas suggests that the material may be used as a substitute material for carrying out gas separation at low pressure from exhaust gas having significantly low partial pressure. In addition, the block copolymer according to the present disclosure shows excellent solubility in a general solvent under the conditions of a high molecular weight and high thermal and mechanical stabilities.

Instrumental Measurement Conditions $^1$H NMR spectrum was obtained by using Agilent 400-MR (400 MHz) instrument with $d_6$-DMSO or $CDCl_3$ in a reference or internal deuterium fixture device. Bruker Vertex 80v, Hyperion2000 ATR-FTIR spectrometer was used to record an attenuated total reflection (ATR)-Fourier transform infrared (FTIR) spectrum.

Molar weight was determined by gel permeation chromatography (GPC) by using C column having two combined PL Gel 30 cm×5 μm at 30° C. in $CHCl_3$, and calibrated based on polystyrene ($M_n$=600-106 g/mol) standards by using a Knauer diffraction index detector.

The thermal stability of a membrane was analyzed by thermogravimetric analysis (TGA); tensile characteristics were determined by using a Shimazu EZ-TEST E2-L system bench top tensile tester at 50° C. under a relative humidity of 50% with a cross head speed of 1 mm/min.

Engineering stress was calculated from the initial sectional area of a sample and Young's coefficient (E) was determined from the initial slope of a stress-strain curve. A membrane sample was cut into a rectangular shape with a size of 40 mm×10 mm (total) and 20 mm×10 mm (test area).

Membrane density (g/cm$^3$) was determined experimentally by using a top load electronic Mettler-Toledo balance (XP205, Mettler-Toledo, Switzerland) combined with a density kit based on the Archimedes principle. A sample was weighed in the order of air and a liquid with known density and high-purity heptane; the measurement was carried out by the buoyancy method at room temperature, and density was calculated according to the following [Mathematical Formula 3].

[Mathematical Formula 3]

$$\rho_{polymer} = \frac{W_0}{W_0 - W_1} \rho_{liquid}$$

wherein $W_0$ and $W_1$ represent the weight of a membrane in air and heptane, respectively. Heptane adsorption of a membrane is not considered because of excessively low absorption property.

The nitrogen adsorption test and mesopore analysis were carried out by using Micromeritics ASAP 2020 HD88 at 77° K. Before a sample was analyzed, deaeration was carried out under vacuum at 150° C. for 10 hours.

The surface area was calculated from a multi-point BET plot, and the pore volume was determined by using the non-local density function theory (NLDFT). The nitrogen adsorption isothermal curves were determined at 77° K. Before each sample was tested, deaeration was carried out at 150° C. for 12 hours.

X-ray diffraction pattern of a membrane was determined by using a diffractometer, Rigaku DMAX-2200H with Cu Kα1 X rays (λ=0.1540598) in a 2θ range of 5° to 30° at a scanning rate of 4/min.

In addition, d-spacing was calculated by using the Bragg's law (d=λ/2 sin θ). Tapping-mode AFM was carried out by using Bruker MultiMode system. To carry out imaging of a sample in a surrounding radius, a silicon cantilever having a terminal radius of <10 nm and a force constant of 40 Nm$^{-1}$ (NCHR, nano-sensor, f=300 kHz).

Gas Permeation Procedure

Determination of pure gas permeability was carried out by high-vacuum lag measurement based on a constant volume/variable pressure method. All experiments were carried out under a feed pressure of 2 atm and a feed temperature of 30° C.

Before such determination, both the feed side and the permeation side were exhausted completely to 10$^{-5}$ torr or less until the reading value of removal of remaining gases. The lower volume was corrected by using the Kapton membrane and was confirmed as 50 cm$^3$. The upper pressure and the lower pressure were measured by using the Baraton converter (MKS; model no. 626B02TBE) in a full scale of 10,000 and 2 torr, respectively. The permeation side pressure was recorded as a time function by using a pressure converter, and sent to a desk top computer through a shield data cable. A permeability coefficient is determined as the linear slope of a down stream pressure vs. time plot (dp/dt) according to the following equation:

[Mathematical Formula 4]

$$P = \frac{273}{76} \times \frac{Vl}{ATp_0} \times \frac{dp}{dt} \quad (2)$$

wherein P is permeability expressed in terms of Barrer (1 Barrer=10$^{-1}$ cm$^3$ (STP)cm cm$^{-2}$ s$^{-1}$ cmHg$^{-1}$); V (cm$^3$) is the lower volume; l (cm) is the thickness of a membrane; A (cm$^2$) is the effective area of a membrane; T(K) is a measurement temperature; $p_0$ (Torr) is the feed gas pressure of the upper chamber; and dp/dt is a pressure variation under a normal state. For each gas, the permeation test was repeated three times or more, and the standard deviation is ±3%. Reproducibility among samples is as high as ±3%, and the effective membrane area is 15.9 cm$^2$.

The ideal perm-selectivity, $\alpha_{A/B}$, of a membrane for a pair of gases (A and B) is defined by the permeability coefficient ratio of individual gases.

[Mathematical Formula 5]

$$\alpha_{A/B} = \frac{P_A}{P_B}$$

Diffusibility and solubility are obtained from the time lag value (9) according to the equation.

[Mathematical Formula 6]

$$D = \frac{l^2}{6\theta}$$

[Mathematical Formula 7]

$$S = \frac{P}{D}$$

wherein D (cm²S⁻¹) is a rigidity coefficient; I is the thickness (cm) of a membrane; θ is a time lag (s) obtained from the intercept of the linear normal state portion in the lower pressure vs. time plot. Solubility, S, was calculated from the formula. Permeability and diffusibility were obtained by the above [Mathematical Formula 7], while satisfying [Mathematical Formula 5] and [Mathematical Formula 6].

DESCRIPTION OF DRAWING NUMERALS

| | |
|---|---|
| 2: Stack | 3: Gas collecting pipe |
| M: Spiral type CO₂ gas separation membrane module | |
| 21: Carbon dioxide separation membrane | |
| 22: Feed side flow path material | |
| 23: Permeation side flow path material | |
| 24: Inlet | 25: Outlet |
| 31: Hole | 32: Outlet |

What is claimed is:

1. A block copolymer represented by the following Chemical Formula 2:

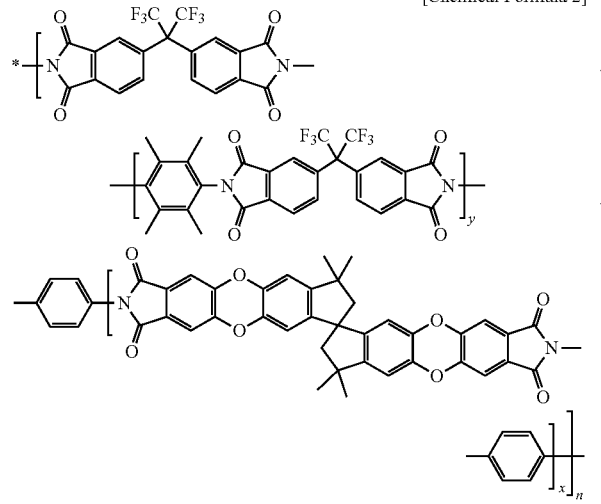

[Chemical Formula 2]

wherein x is an integer of 5-100;
y is an integer of 100-300; and
n is an integer of 5-150.

2. The block copolymer according to claim 1, wherein the block copolymer represented by Chemical Formula 2 comprises the repeating units mixed at a ratio of x:y of 1:3-10.

3. The block copolymer according to claim 2, wherein the ratio of x:y is 1:4-6.

4. A carbon dioxide separation membrane comprising the block copolymer as defined in claim 1.

5. A carbon dioxide separation membrane module comprising the carbon dioxide separation membrane as defined in claim 4.

6. An apparatus for separating carbon dioxide which comprises the carbon dioxide separation membrane module as defined in claim 5, and a gas supplying unit for supplying a mixed gas containing at least carbon dioxide and water steam to the carbon dioxide separation membrane module.

7. A method for manufacturing a carbon dioxide separation membrane, comprising the steps of:
   (A) preparing a compound represented by the following [Chemical Formula 3];
   (B) preparing a compound represented by the following [Chemical Formula 4]; and
   (C) polymerizing the compound represented by [Chemical Formula 3] with the compound represented by [Chemical Formula 4] at a repeating unit ratio of 1:3-10 to obtain a block copolymer

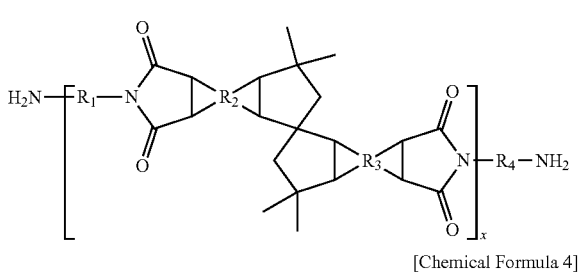

[Chemical Formula 3]

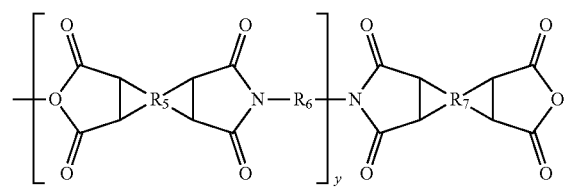

[Chemical Formula 4]

wherein for Chemical Formula 3, each of R₁ to R₄ is a C1-C10 alkyl group, C1-C10 alkoxy group, C1-C10 heteroalkyl group, substituted or non-substituted C5-C14 aryl group or a substituted or non-substituted C4-C19 heteroaryl group containing N, S, O; and x is an integer of 5-100; and wherein for Chemical Formula 4, each of R₅ to R₇ is a C1-C10 alkyl group, C1-C10 alkoxy group, C1-C10 heteroalkyl group, substituted or non-substituted C5-C14 aryl group or a substituted or non-substituted C4-C19 heteroaryl group containing N, S, O; and y is an integer of 100-300.

8. The method for manufacturing a carbon dioxide separation membrane according to claim 7, wherein each substituent of the substituted aryl or substituted heteroaryl in R₁ to R₇ is a C1-C10 alkyl group, C1-C10 alkoxy group, C1-C10 alkylamino group, C1-C10 alkylsilyl group, C5-C14 aryl group, C4-C19 heteroaryl group containing N, S, O, cyano group or a halogen.

* * * * *